(12) United States Patent
Kuroda et al.

(10) Patent No.: US 6,551,679 B1
(45) Date of Patent: *Apr. 22, 2003

(54) OPTICAL RECORDING MEDIUM

(75) Inventors: Yuji Kuroda, Tokyo (JP); Yutaka Kasami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/403,847

(22) PCT Filed: Feb. 24, 1999

(86) PCT No.: PCT/JP99/00850

§ 371 (c)(1),
(2), (4) Date: Sep. 24, 2001

(87) PCT Pub. No.: WO99/44199

PCT Pub. Date: Sep. 2, 1999

(30) Foreign Application Priority Data

| Feb. 24, 1998 | (JP) | ............................................ | 10-042587 |
| Oct. 12, 1998 | (JP) | ............................................ | 10-289826 |
| Feb. 13, 1999 | (JP) | ............................................ | 11-074246 |

(51) Int. Cl.$^7$ ................................................. B32B 3/02
(52) U.S. Cl. ..................... 428/64.1; 428/64.5; 428/64.6; 430/270.13
(58) Field of Search ............................... 428/64.1, 64.2, 428/64.4, 64.5, 64.6, 913; 430/270.13, 495.1, 945

(56) References Cited

U.S. PATENT DOCUMENTS 6,312,780 B1 * 11/2001 Kasami ..................... 428/64.1

FOREIGN PATENT DOCUMENTS

| JP | 6- 195747 | 7/1994 |
| JP | 8-96411 | 4/1996 |
| JP | 8-124218 | 5/1996 |
| JP | 9-7176 | 1/1997 |
| JP | 9-35332 | 2/1997 |
| JP | 9-282713 | 10/1997 |
| JP | 10-27382 | 1/1998 |

* cited by examiner

Primary Examiner—Elizabeth Mulvaney
(74) Attorney, Agent, or Firm—Sonnenschein, Nath & Rosenthal

(57) ABSTRACT

An optical recording medium is disclosed which incorporates a recording layer made of a phase-change material. The optical recording medium has a structure such that the ratio Ac/Aa of absorptance Ac realized when the recording layer is in a crystal state and absorptance Aa realized when the recording layer is in an amorphous state is 0.9 or higher. Moreover, a crystallization enhancing layer for enhancing crystallization of the phase-change material is formed which is made to contact with at least either surface of the recording layer. Since control of the absorptance and enhancement of crystallization are simultaneously performed, the difference between the physical properties of crystal and those of amorphous can be reliably compensated for. Thus, a satisfactory direct overwriting can be performed even under high speed and dense conditions.

43 Claims, 18 Drawing Sheets

OPTICAL RECORDING MEDIUM

BACKGROUND OF THE INVENTION

1. Field of the Invention

The present invention relates to a phase-change type optical recording medium, and more particularly to a phase-change type optical recording medium which permits high-speed direct overwriting.

2. Description of the Related Art

As a practical example of an optical disc made of a phase-change recording material and permitting overwriting, a so-called DVD-RAM has been marketed which realizes a linear velocity of 6 m/second, a bit length of 0.41 μm/second, a track pitch of 0.74 μm, a laser wavelength of about 650 nm, a data transfer rate of 11 Mbps and a recording capacity of 2.6 GB.

To realize a larger capacity and a higher transfer rate, it is effective to reduce the spot size of a recording laser beam to raise the linear recording velocity. As a specific method of reducing the spot size of the recording laser beam, a method of shortening the wavelength of the laser beam and a method of enlarging the numerical aperture of the object lens are exemplified.

When both the method of shortening the wavelength of the laser beam and the method of enlarging the numerical aperture are employed, the spot size can be further reduced as compared with a structure in which only one of these methods is employed. When a violet laser beam having a wavelength of about 400 nm is employed as the light source and an objective lens having a numerical aperture (NA) of 0.85 is employed, higher density recording is theoretically permitted.

On the other hand, conditions under which high speed direct overwriting is permitted for the phase-change optical disc become more severe for the following reasons.

In general, the phase-change optical disc is irradiated with a large-power laser beam so that the temperature of the recording layer is raised to a level not lower than the melting point of the recording layer. The recording layer is melted, and then the temperature is rapidly lowered, resulting in writing being performed. The recorded marks are crystallized, that is, erased because the recording layer is maintained in a temperature range between a temperature at which the crystallization of the recording layer is started and the melting point for a time required for the recording layer to be formed into crystal.

When the foregoing method of shortening the wavelength of the laser beam and the method of enlarging the numerical aperture of the objective lens are employed, the temperature of a position on the optical disc is changed in a time shorter than the time required for the conventional structure under a condition that the linear recording velocity is high. FIG. 1 shows a result of calculations of a process of change of the temperature at one point on an optical disc as time elapses. As can be understood from FIG. 1, as the linear velocity is raised, and as the numerical aperture NA of the objective lens is enlarged, the time for maintaining the temperature not lower than the crystallizing temperature (for example, assuming that the temperature is 400° C.) is maintained is shortened.

Therefore, a recording material having the crystallizing velocity which is the same as that of the conventional material encounters difficulty in crystallizing amorphous marks, that is, in erasing the amorphous marks.

So-called direct overwriting (DOW) is considered with which the power level of one laser beam is controlled in terms of time to perform recording. If the spot size is too small or if the linear recording velocity is too high, distortion of the shapes of marks is increased due to the difference in the physical properties between amorphous and crystal which is a peculiar problem for phase-change recording. That is, when a next mark is overwritten on a written recording mark, the size of a recording mark is, under the foregoing condition, enlarged as compared to a case in which the next mark is newly written on a crystal portion in which no data has been written.

The foregoing fact is caused from the following differences from the crystal phase: the response (an optical constant) of the amorphous phase with respect to a laser beam; a process of conduction of heat (heat conductivity) generated due to reactions with the laser beam; and a method of using generated heat (latent heat is not required when dissolving is performed). When the spot size is large and the linear velocity is low, change in the temperature of the recording film is moderate in terms of time. Heat is conducted prior to movement of the existing mark to the laser beam, maintaining the mark at the previous crystallizing temperature. Therefore, a state similar to a state in which no mark exists can be realized (previous crystallization) and the foregoing problem does not arise.

The foregoing problems virtually inhibit a usual phase-change recording disc having a four-layered structure consisting of a $ZnS$—$SiO_2$ layer, a recording layer, a $ZnS$—$SiO_2$ layer and a reflecting layer, from having a higher density and a higher transfer rate. For example, deterioration in the value of jitters as the linear velocity is raised as shown in FIG. 2 has been confirmed as a result of experiments.

As a way of overcoming the foregoing problem, it might be considered feasible to raise the crystallizing velocity of the recording layer. That is, time required to complete crystallization could be shortened so as to raise the erasing ratio and facilitate previous crystallization.

However, a material, the phase of which is reversibly changed, which has a crystallizing velocity higher than those of the conventional materials and which can be applied to an optical disc, cannot virtually be obtained.

As an alternative to raising the crystallizing velocity of the recording material, techniques for raising the crystallizing velocity of the recording layer by providing a crystallization enhancing material, which is effective to raise the crystallizing velocity of amorphous, such that the material is in contact with the recording layer have been disclosed. The foregoing techniques have been disclosed in Japanese Patent Laid-Open No. 1-92937, Japanese Patent Laid-Open No. 6-195747 and Japanese Patent Application No. 9-532424.

The foregoing methods, however, encounter a problem in that the preservation stability of the recording marks deteriorates in a temperature range under a condition of daily use. Another problem arises in that the recording mark is undesirably erased even with a laser beam for reproducing data.

As a method structured individually from the foregoing enhancement of crystallization, methods of a type inverting the absorption ratio of amorphous which is usually higher than that of crystal is inverted (the temperature raising velocity of the crystal portion and that of the amorphous portion are balanced) by controlling the lamination structure of the thin optical film have been disclosed. The foregoing method is a so-called absorption-ratio control method which has been disclosed in Japanese Patent Laid-Open No. 8-124218 and Japanese Patent Laid-Open No. 9-91755.

The foregoing method, however, suffers from a problem in that the degree of freedom of optical design (absorptance, reflectance and so forth) decreases. Another problem arises in that satisfactory durability against repeated overwriting cannot be realized.

An even greater problem is that conditions in which the diameter of the spot is reduced and the linear velocity is high encounter unsatisfactory basic erasing performance (for example, erasing ratio obtained with DC light) which is required to obtain an effect of controlling the absorptance.

SUMMARY OF THE INVENTION

An object of the present invention is to provide an optical recording medium arranged to reduce the spot size and raise the linear recording velocity to raise the recording density and transfer rate and enable satisfactory direct overwriting to be performed without deterioration in the durability against repeated use and stable preservation characteristic of the recorded signal.

To achieve the foregoing object, the optical recording medium according to the present invention comprises a recording layer made of at least a phase-change material, wherein a ratio $Ac/Aa$ of absorptance $Ac$ of the recording layer in a state in which the recording layer is crystal with respect to the wavelength of recording/reproducing light and absorptance $Aa$ of the recording layer in a state in which the recording layer is amorphous is 0.9 or higher, and a crystallization enhancing material for enhancing crystallization of the phase-change material is in contact with at least either surface of the recording layer.

The basic idea of the present invention is to employ both absorptance control and enhancement of crystallization. The two components are combined with each other so that the difference between the physical properties of crystal and those of amorphous is reliably compensated. Thus, satisfactory direct overwriting can be performed.

Each of the methods, that is, the absorptance control and the enhancement of crystallization, are able to reduce the foregoing problems to an allowable level. Deterioration in the durability against repeated use and the characteristic of stably preserving a recorded signal can be prevented.

The absorptance control and the enhancement of crystallization are mutually contradictory techniques. If the two techniques are combined with each other, undesirable compensation is expected. Therefore, substantially no attempt of the foregoing combination has been made.

The inventors of the present invention have found that some countermeasure is required to overcome a problem in that the value of jitters cannot be reduced if the absorptance control is performed under a condition of a high linear velocity.

Various investigations carried out by the inventors included combining the absorptance control and the enhancement of the crystallization resulting in the discovery that their advantages can maximally be realized and problems of each techniques can substantially be prevented if the design is properly performed.

The absorptance control is performed such that a contrivance of the lamination structure of the film prevents absorption in the amorphous state of the recording layer. As a result, the erasing sensitivity deteriorates in spite of improvement in the durability against repeated reproduction.

When high speed crystallization is realized by providing the crystallization enhancing layer, the erasing sensitivity can be improved. However, durability against repeated reproduction deteriorates.

When the foregoing techniques are combined with each other, the recording mark can be erased as required i.e., high-speed overwriting is permitted. When erasing of the recording mark is not required, erasing is inhibited. For example, a crosswriting characteristic can be improved and also the preservation stability can be improved. Moreover, a rise in the value of jitters caused from an increase in the number of reproducing operations can be prevented.

The foregoing unexpected facts have been found by the inventors of the present invention.

DESCRIPTION OF THE PREFERRED EMBODIMENTS

An optical recording medium (an optical disc) according to the present invention is described below with reference to the drawings.

Figure 1:
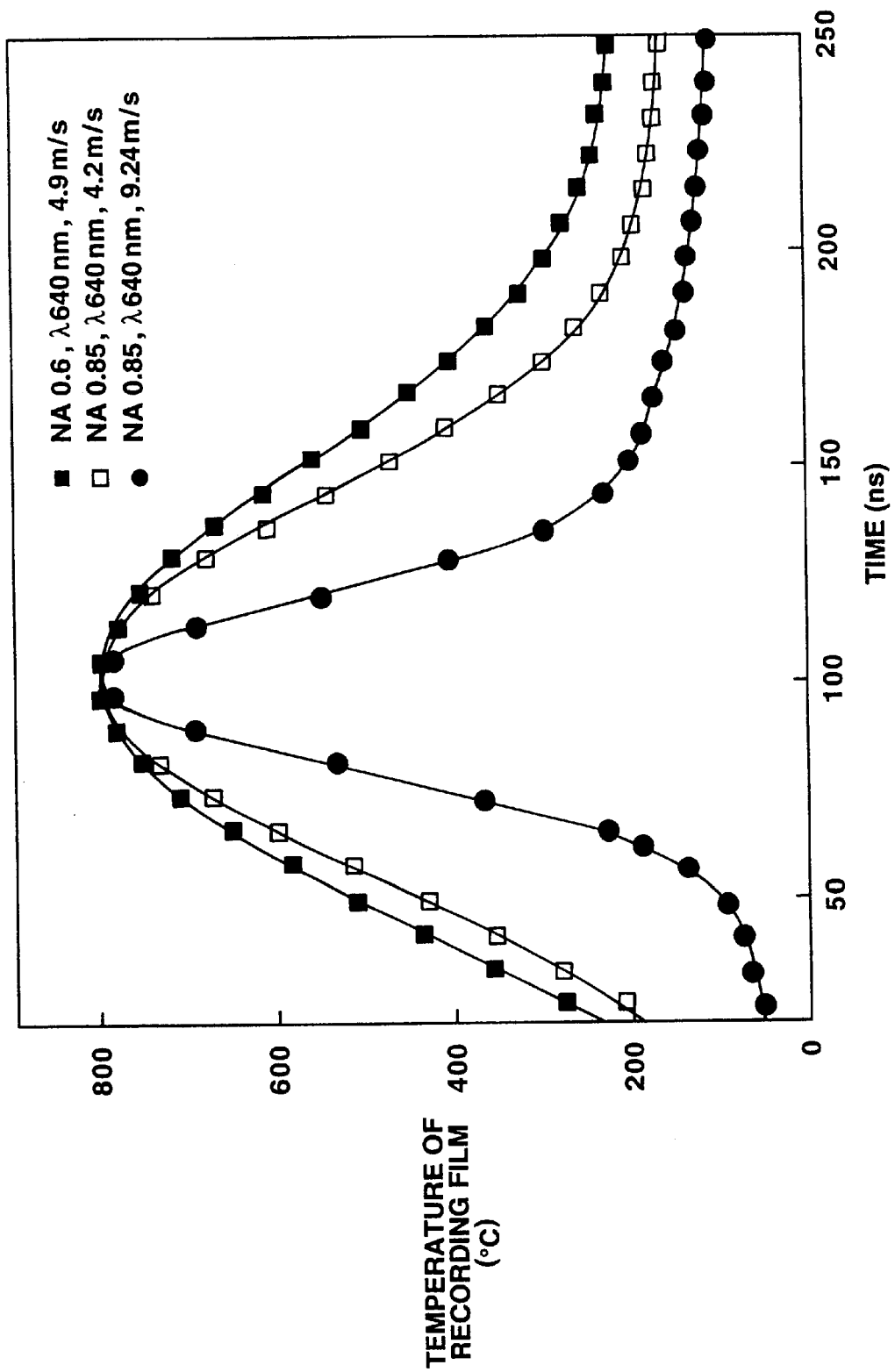
FIG. 1 is a characteristic graph showing change in the duration of the crystallizing temperature occurring due to the difference in the linear velocity and the numerical aperture NA.
Figure 2:
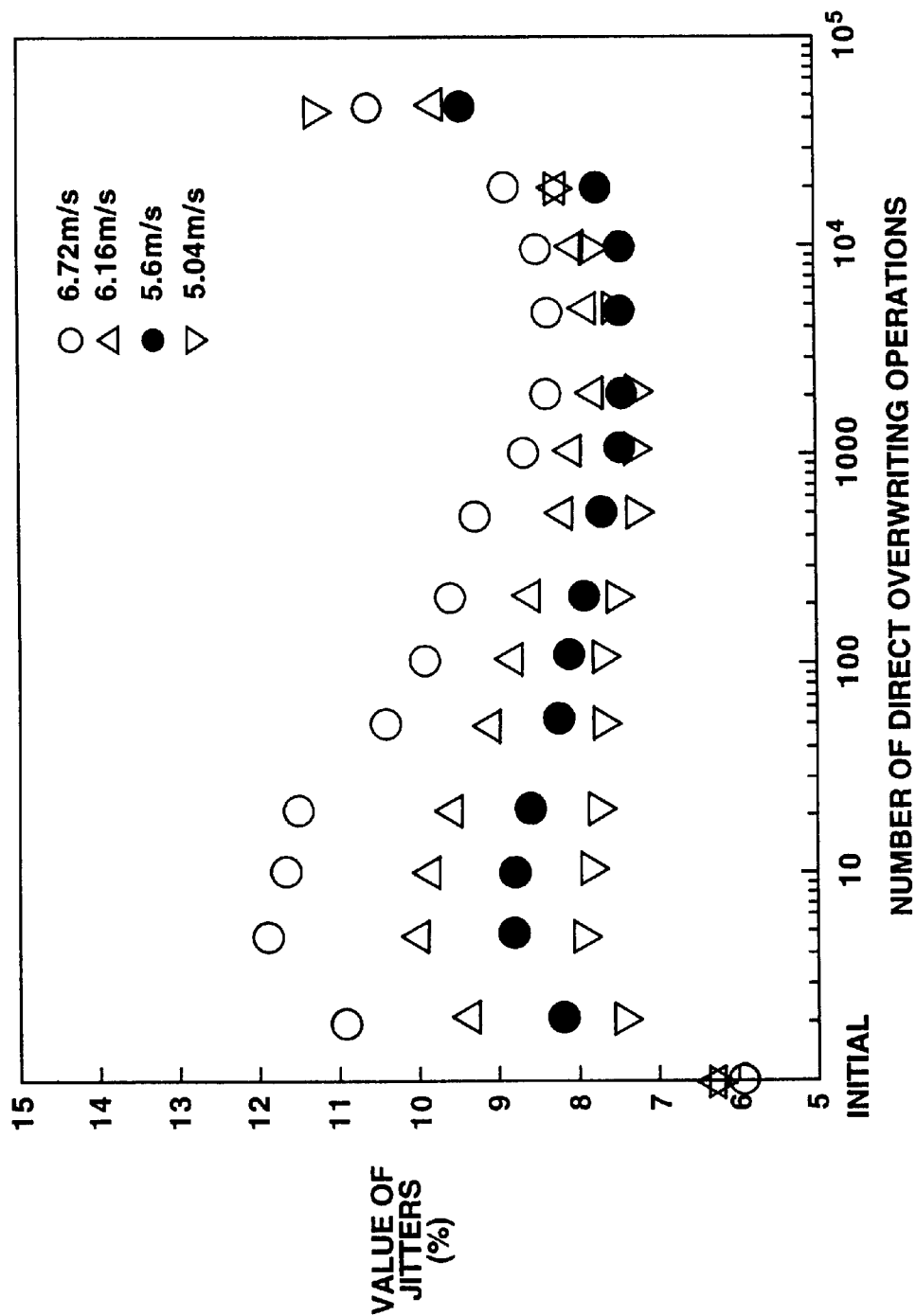
FIG. 2 is a characteristic graph showing the relationship between the linear velocity and the value of jitters of an optical recording medium having a conventional structure.
Figure 3:
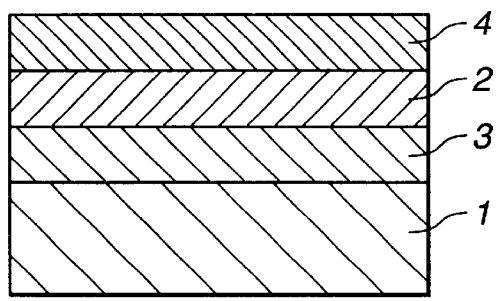
FIG. 3 is a schematic cross sectional view showing an example of a basic structure of an optical disc according to the present invention.

FIG. 3 is a diagram showing the basic structure of the optical disc according to the present invention and incorporating a transparent substrate 1 having a thickness of, for example, 0.3 mm or greater. A recording layer 2 is formed on the transparent substrate 1. Moreover, crystallization enhancing layers 3 and 4 are formed in contact with the two surfaces of the recording layer 2.

The crystallization enhancing layer may be formed on only one surface of the recording layer 2.

Usually, a phase-change optical recording medium incorporates a reflecting film made of a metal material, such as Al, and having a somewhat large thickness. In the foregoing case, recording/reproducing light is substantially completely reflected by the reflecting layer. A ratio Ac/Aa of the absorptance Ac realized when the recording layer 2 is in a crystal state and the absorptance Aa realized when the recording layer 2 is in an amorphous state is about 0.8.

The present invention has a structure such that the film design causes the reflecting layer to be, for example, a transmissive-type reflecting layer which permits partial transmission of light. Moreover, the thickness of the foregoing layer, that of the recording layer 2 and that of a dielectric layer described below, are controlled. Thus, when the recording layer 2 is in a crystal state with respect to the wavelength of the recording/reproducing laser beam (applied to the following description), the ratio Ac/Aa of the absorptance Ac of the recording layer and the absorptance Aa of the recording layer when the recording layer 2 is in the amorphous state is made to be 0.9 or greater. It is preferable that Ac/Aa is 1.2 or greater and that the absorptance Aa in the amorphous state is 60% or lower.

A plurality of structures are able to realize the Ac/Aa to be 0.9 or greater. One of the methods is to form the reflecting film into a transmission-type reflecting film. Another method is a method which employs a light-absorption control layer. The foregoing structure can be realized without use of the foregoing methods. That is, contrivances of the thickness, the material and the structure (employment of a multilayered structure) of the dielectric material enables the foregoing structure to be realized as described below.

When the ratio Ac/Aa of the absorptance is made to be 0.9 or greater, the crystal portion can be relatively easily heated. Thus, the size of a recording mark which is written on a portion in a crystal state in which no data has been written can approach the size of a recording mark which is overwritten on a recording mark in the amorphous state.

Note that a direction in which the ratio Ac/Aa of the absorptance is raised is a direction in which, for example, the thickness of the reflecting layer is reduced. In the foregoing case, a problem in terms of heat sinking arises. Therefore, it is preferable that raising of the ratio Ac/Aa is limited to satisfy a proper range.

The reflecting layer is usually made of a metal film having a somewhat large thickness, as described above, thus serving as the heat sink. But if the reflecting layer is made of Si or if the thickness of the reflecting layer is reduced, the reflecting layer cannot satisfactorily serve as the heat, and heat cannot easily be radiated. Hence it follows that a heat accumulating structure is realized which deteriorates durability against repeated use.

Therefore, the ratio Ac/Aa has an allowable range (an upper limit) which varies depending on the wavelength of recording/reproducing light. In, for example, a present wavelength region (630 nm to 650 nm), it is preferable that the ratio Ac/Aa of the absorptance is 2.0 or lower.

The absorptance Ac in the crystal state is an absorptance of the recording layer when the recording layer is in the crystal state. Similarly, the absorptance Aa in the amorphous state is an absorptance of the recording layer when the recording layer is in the amorphous state.

The foregoing values cannot directly be measured when the structure is a multilayered structure. As a result of multiple interference of a multilayered film, the intensity of light which is absorbed into the recording layer must be calculated. Then, the intensity of light must be divided by the intensity of incident light.

The absorptance Ac and the absorptance Aa according to the present invention are defined as follows.

Figure 4:
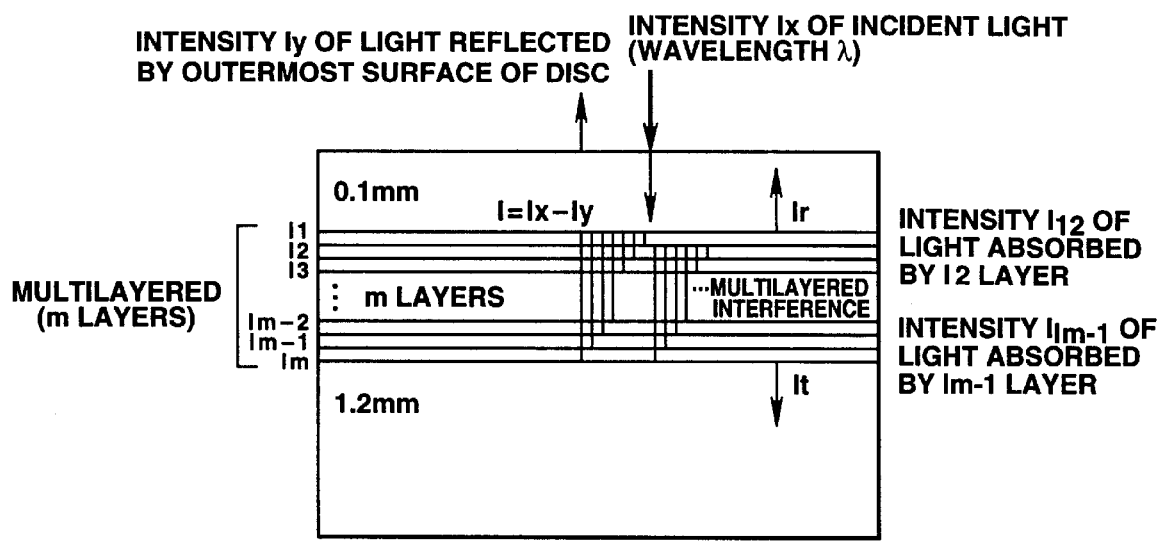
FIG. 4 is a schematic view for defining reflectance, transmittance and absorptance of a multilayered film.

A multilayered film (an m layer) structured as shown in FIG. 4 is considered. In this case, the reflectance R of the disc, the transmittance T of the disc, the absorptance A of the disc, absorptance $A_{l2}$ of an $l_2$ layer (for example, the recording layer) and absorptance $A_{lim-1}$ of an $l_{m-1}$ layer (for example, the reflecting layer) are defined as follows.

Note that an assumption is made that only vertical factors apply (diagonal incident factors are ignored). Another assumption is made that each interface is smooth and flat (an influence of asperities, such as grooves, is ignored). Moreover, only multiple interference of the multilayered film is factored in. Intensity I of incident light serving as a reference is a value obtained by subtracting intensity Iy of light reflected by the outermost surface from actual intensity Ix of incident light.

| | |
|---|---|
| Reflectance R of disc: | $100 \times Ir/I$ (%) |
| Transmittance T of disc: | $100 \times It/I$ (%) |
| Absorptance A of disc: | $100 \times (I-Ir-It)$ (%) |
| Absorptance $A_{12}$ of $1_2$ layer (for example, the recording layer): | $100 \times I_{12}/I$ (%) |
| Absorptance $A_{lm-1}$ of $l_{m-1}$ layer (for example, the recording layer): | $100 \times I_{lm-1}/I$ (%) |

Note that Ir is the intensity of light reflected by the multilayered film, It is the intensity of light which transmits the multilayered film, $I_{12}$ is intensity of light which is absorbed by the $l_2$ layer (for example, the recording layer) and $I_{lm-1}$ is the intensity of light which is absorbed by the $l_{m-1}$ layer (for example, the reflecting layer).

The absorptance Ac and the absorptance Aa are values obtained by dividing the intensity of light which is absorbed by the recording layer (in the crystal state or the amorphous state) as a result of the multiple interference of the multilayered film, with intensity I of light made incident on the multilayered film.

The foregoing calculation of the multiple interference can be performed by using a characteristic matrix if the wavelength of the laser beam, the thickness of each layer and the complex index of refraction (n–ik) are known.

A multiplicity of documents about the method of calculating the multiple interference have been published, for example "Applied Optics I" (chapter 1-2-2: Intensity of Light) and "Applied Optics II) (Chapter 4-3-2: Multilayered Film) published by Baifu-kan and written by Ikuo Tsuruta and "Thin Optical Film (chapter 3: Multilayered film and Quad-terminal Circuit)" Optical Technique Series II, edited Shiro Fujiwara and published by Kyoritsu.

As disclosed in the foregoing documents, the relationship can be understood between the electric field and a tangent component of the magnetic field on, for example, a J-th boundary and those on the (J–1)-th boundary.

Energy I of light is expressed by an average |S| of absolute values of pointing vector S. Absorption $A_j$ of a J-th layer is expressed by $A_j=I_{j-1}-I_j$. The absorptance is expressed by $(I_{j-1}-I_j)/I_0$ (where $I_0$ is incident energy obtained by subtracting the surface reflection component).

The foregoing calculations are performed by known algorithms which simplify these calculations. In this specification, expression that "only (single layer)" is the foregoing case in which m=1.

The operations of the crystallization enhancing layers 3 and 4 are described below.

Figure 5:
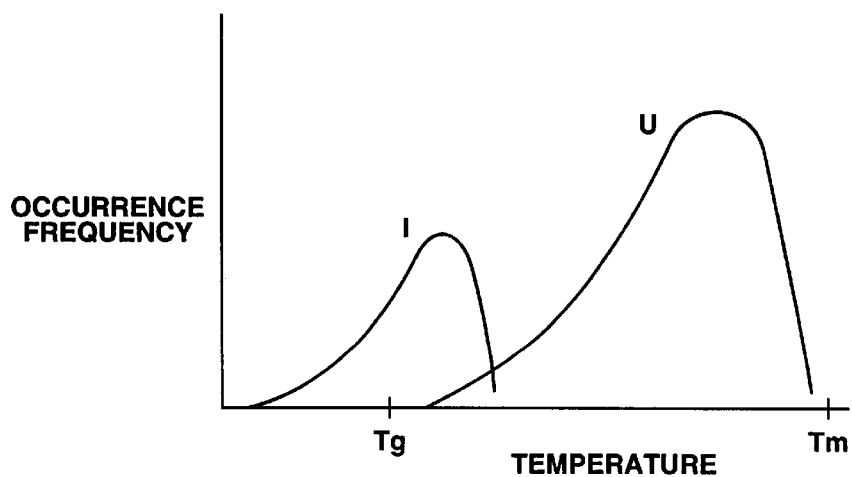
FIG. 5 is a characteristic graph showing dependence of core generating velocity and crystal growing velocity on the temperature.

In general, crystallization of amorphous proceeds in two stages consisting of generation of crystal core and growth of crystal. An assumption is made that generation of the crystal core randomly occurs in the overall portion in the amorphous phase. As shown in FIG. 5, core generating velocity I is raised as the temperature is raised. The core generating velocity I is raised to a maximum value at a temperature somewhat higher than the glass transition point Tg. The core generating velocity I is rapidly lowered at temperatures higher than the glass transition point Tg. On the other hand, the growth velocity U is raised to a maximum value at a temperature close to the melting point Tm.

In the case of an amorphous mark of an optical disc which is different from the foregoing assumption, FIG. 3 shows that the recording material layer 3 has two surfaces. Generation of the core easily occurs at the interfaces between the recording material layer 3 and layers interposing the recording material layer 3. It is known that the chemical or physical properties of the interface exert a great influence on the frequency of generation of the cores.

Control of the crystallizing velocity is effectively performed by controlling the states of the interfaces interposing the recording layer 2 to control the generating frequency of the crystal cores.

The present invention is structured such that the crystallization enhancing layers 3 and 4 (either of the layers is permitted) are formed in contact with the recording layer 2 so that the generating frequency of the crystal cores is controlled. The crystallization enhancing layers 3 and 4 formed in contact with the recording layer 2 enable the generation of the crystal cores to be enhanced so as to raise the crystallizing velocity. Hence it follows that a satisfactory overwrite erasing ratio can be realized under the high-speed transfer condition and satisfactory values of jitters can be obtained.

Note that the crystallization enhancing layers 3 and 4 may be one layer also serving as the dielectric material layer. For example, a structure may be employed in which the usual dielectric material layer is made of ZnS—$SiO_2$ (in particular, a molar ratio of about 4:1) and a layer for enhancing crystallization is formed on the surface which is in contact with the recording layer 2. As an alternative to this, the dielectric material may be a material which enhances crystallization. That is, the crystallization enhancing layer made of the following material for enhancing crystallization must be in contact with the recording layer 2. The existence of the dielectric material layer and the type of the material for making the dielectric material layer are not limited. It is known that contact of the crystallization enhancing layer with either surface of the recording layer 2 raises the crystallizing velocity of the recording layer 2 as compared with the structure having no crystallization enhancing layer. Note that a greater effect of enhancing the crystallization can be obtained when the connection enhancing layers are formed in contact with the two surfaces of the recording layer 2.

Known matrials may be employed for enhancing the crystallization, (having an attenuation coefficient k with respect to the wavelength of the recording/reproducing laser beam of 0.3 or smaller) for use as the dielectric material in the optical recording medium, except for a sulphide. For example, the layer may be made of: nitride, oxide, carbide, fluoride, nitroxide, nitrocarbide, oxycarbide of metal of semimetal, such as Al, Si, Ta, Ti, Zr, Nb, Mg, B, Zn, Pb, Ca, La or Ge, or the layer may contain one of the foregoing materials as the main component. The layer is exemplified by a layer made of $AlN_x$ ($0.5 \leq x \leq 1$) in particular AlN; $Al_2O_{3-x}$ ($0 \leq x \leq 1$) in particular $Al_2O_3$; $Si_3N_{4-x}$ ($0 \leq x \leq 1$) in particular $Si_3N_4$; $SiO_x$ ($1 \leq x \leq 2$) in particular $SiO_2SiO$; MgO; $Y_2O_3$, $MgAl_2O_4$; $TiO_x$ ($1 \leq x \leq 2$) in particular $TiO_2$; $BaTiO_3$; $SrTiO_3$; $TaO_{5-x}$ ($0 \leq x \leq 1$) in particular $Ta_2O_5$; $GeO_x$ ($1 \leq x \leq 1$) in particular $Ta_2O_5$; $GeO_x$ ($1 \leq x \leq 2$); SiC; Ge—N; Ge—N—O; Si—N—O; $CaF_2$; LaF; $MgF_2$; NaF, or by $ThF_4$; or a layer containing the foregoing material as the main component thereof. The foregoing layers have the function of enhancing the crystallization. Also a layer made of a mixture of the foregoing materials such as AlN—$SiO_2$, has the function of enhancing the crystallization.

The foregoing materials themselves, however, have not sufficient functions for enhancing crystallization. Therefore, a satisfactory signal characteristics cannot be obtained under severe conditions.

Therefore, it is preferable that any one of the following materials among the foregoing materials having the function for enhancing crystallization may be used to form the crystallization enhancing layer: Si—C, Si—C—O, Si—C—H, Si—C—H—O, Si—N, Si—N—O, Si—N—H, Si—N—H—O, Si—C—N, Si—C—N—O, Si—C—N—H, Si—C—N—H—O, Si—O, Si—O—H, Al—N or Al—O.

For example, a material may be used which is made of Si—C, $Si_3N_4$, $SiO_2$, AlN, $Al_2O_3$ or the like, or a material may be employed which contains any one of the foregoing materials as the main component and into which an element, such as oxygen, hydrogen or nitrogen, has been introduced.

When the foregoing material and control of the absorptance (Ac/Aa≧0.9) according to the present invention were combined, a great effect of enhancing crystallization was obtained, as well as a satisfactory effect of preventing values of jitters, as described in the embodiment of the present invention. Moreover, improvement in the durability against repeated overwriting operation has been confirmed. When the structure according to the embodiment and the material, which contains SiC as the main component and into which O or H has been introduced, were combined, a satisfactory effect was obtained, as well as a satisfactory crosswriting characteristic and the mark preservation stability were obtained. Moreover, separation at the interface with the recording layer and alloying were prevented and light absorptivity was reduced. Therefore, the foregoing material in contact with the recording layer was a satisfactory material, implying the foregoing materials for enhancing crystallization are preferred materials.

Although the thickness of the crystallization enhancing layer is not limited, it is preferable that the thickness is 1 nm or greater to form a uniform film. When the structure according to the embodiment was arranged such that the thickness of the foregoing layer was 2 nm or greater, an effect of reducing values of jitters was obtained.

The following non-exhaustive list of methods exemplify possible methods for forming the crystallization enhancing layer.

SiC can be formed by sputtering, for example, a SiC target by using Ar gas by an RF sputtering method.

$Si_3N_4$ can be formed by sputtering a Si target by using Ar—$N_2$ gas by a reaction sputtering method.

$SiO_2$ can be formed by sputtering a $SiO_2$ target by using Ar gas by an RF sputtering method.

AlN can be formed by sputtering an Al target by using Ar—$N_2$ gas by the reaction sputtering method.

$Al_2O_3$ can be formed by sputtering an Al target by using Ar—$O_2$ gas by the reaction sputtering method.

Si—C—H—O can be formed by sputtering a SiC target by using Ar gas containing $H_2O$ (for example, 300 ppm) by the RF sputtering method.

When the crystallization enhancing layers 3 and 4 (FIG. 3) are provided, generation of the crystal core is enhanced, allowing a faster crystallizing speed. Thus, a great advantage can be realized for direct overwriting.

If the crystallizing speed is too high, the preservation stability of the formed recording mark (the amorphous mark) deteriorates. If the crystallizing speed is too low, the effects of the crystallization enhancing layers 3 and 4 cannot be obtained. From the foregoing viewpoints, the crystallizing speed must be appropriately controlled.

The optical disc according to the present invention has the foregoing basic structure, although the layer structure can be arbitrarily changed.

Figure 6:
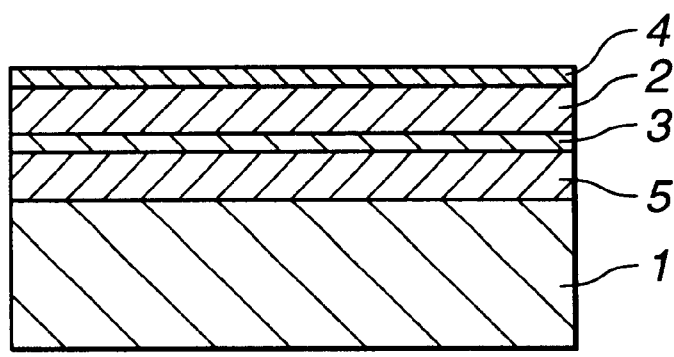
FIG. 6 is a schematic cross sectional view showing an essential portion of an example of an optical disc incorporating a reflecting layer.

FIG. 6 shows an example in which the reflecting layer 5 is formed. In the foregoing case, the reflecting layer 5 and the recording layer 2 are sequentially formed on the transparent substrate 1.

A recording/reproducing laser beam is applied from a position adjacent to the recording layer 2 so that recording/reproducing is performed. In the foregoing case, it is preferable that a light transmission protective layer is formed on the recording layer 2.

Figure 7:
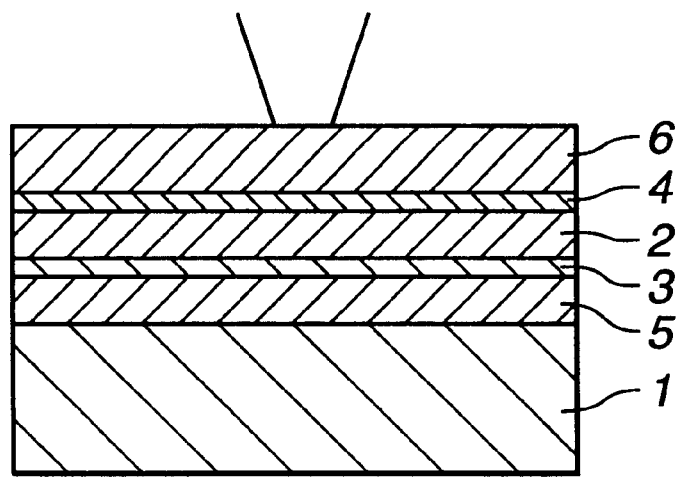
FIG. 7 is a schematic cross sectional view showing an essential portion of an example of the structure of an optical disc incorporating a light transmission protective layer.

An example having the light transmission protective layer is shown in FIG. 7. In this example, the reflecting layer 5, the recording layer 2 and the light transmission protective layer 6 are sequentially formed on the transparent substrate 1. Moreover, the crystallization enhancing layers 3 and 4 are formed in contact with the two surfaces of the recording layer 2.

The optical disc is irradiated with recording/reproducing light from a position adjacent to the light transmission protective layer 6 so that recording/reproducing with respect to the recording layer 2 is performed.

As a matter of course, the optical disk structure is not limited to the foregoing structure. A structure may be employed in which the recording layer 2 and the reflecting layer 5 are, in this order, formed on a transparent substrate 1, resulting in recording/reproducing being performed from the position adjacent to the transparent substrate 1. When recording/reproducing is performed from the position adjacent to the light transmission protective layer 6 which has a small thickness, high recording density can be realized because the numerical aperture of the objective lens can be enlarged while a skew margin is being maintained. Therefore, an effect of the application of the present invention can be obtained. Since the recording spot is finer, the temperature of one point on the optical disc is changed in a shorter time. Therefore, direct overwriting becomes more difficult in a way similar to the rise in the linear velocity.

Figure 8:
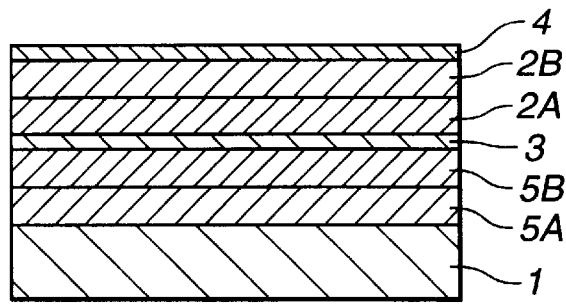
FIG. 8 is a schematic cross sectional view showing an essential portion of an example of the structure of an optical disc having multilayered reflecting and recording layers.

As an alternative to this, the recording layer may be composed of a first recording layer 2A and a second recording layer 2B, as shown in FIG. 8. The reflecting layer may be composed of two layers consisting of a first reflecting layer 5A and a second reflecting layers 5B. When each of the recording layers and the reflecting layers are formed into a multilayered structure having two or more layers, the degree of freedom in optical design is improved. When the reflecting layer is composed of two or more different layers (different in terms of either the material, the composition and/or the complex index of refraction), a dielectric material layer may be inserted into an arbitrary position between the reflecting layer. The number of the dielectric material layers may be determined arbitrarily.

Figure 9:
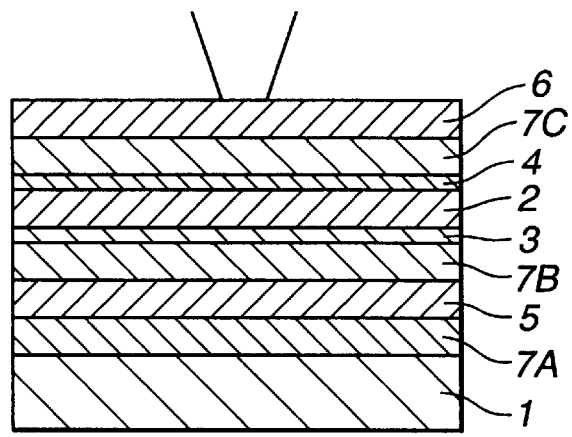
FIG. 9 is a schematic cross sectional view showing an example of a structure of an optical disc incorporating a dielectric material layer inserted between the layers thereof.

For example, as shown in FIG. 9, a dielectric layer 7 (7C, 7B or 7A) may be disposed between the light transmission protective layer 6 and the recording layer 2, between the recording layer 2 and the reflecting layer 5 or between the reflecting layer 5 and the transparent substrate 1. The dielectric material layer is disposed at one or more positions between the foregoing layers. FIG. 9 shows a structure in which the dielectric layers 7 are disposed among all of the layers.

When the dielectric layers 7 are disposed while the thickness of each layer is being adjusted, the optical characteristics can be controlled. As a result, the absorptance can easily be controlled.

Note that each dielectric layer 7 may be formed into a multilayered film composed of two or more layers.

Figure 10:
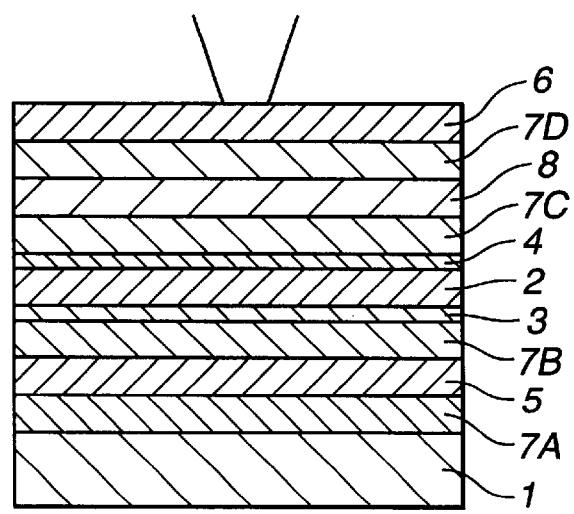
FIG. 10 is a schematic cross sectional view showing an essential portion of an example of the structure of an optical disc incorporating a light-absorption control layer.

As shown in FIG. 10, a light-absorption control layer 8 is formed more adjacent to the position from which recording/reproducing light is applied as compared to the recording layer 2 to control the absorptance. Also in the foregoing case, the dielectric layer 7 (7D, 7C, 7B or 7A) may be inserted into an arbitrary position, including a position between the light-absorption control layer 8 and the light transmission protective layer 6, and a position between the light-absorption control layer 8 and the recording layer 2.

Also the light-absorption control layer 8 may be composed of two or more different layers (different in terms of either the material, the composition and/or the complex index of refraction). Also in the foregoing case, a dielectric material layer may be inserted into an arbitrary position between light absorptance control layers. The number of the dielectric material layers which are inserted may be determined arbitrarily.

Among the foregoing structures, a preferred structure is exemplified by a structure composed of: a substrate, a first dielectric material layer, a reflecting layer, a second dielectric material layer, a first crystallization enhancing material, a recording layer, a second crystallization enhancing material, a third dielectric material layer, a light transmission protective layer.

In the foregoing case, it is preferable that the thickness of the substrate is 1.0 mm to 1.2 mm, that of the first dielectric material layer is 200 nm or smaller, that of the reflecting layer is 20 nm to 70 nm, that of the second dielectric material layer is 5 nm to 60 nm, that of the first crystallization enhancing material is 2 nm to 20 nm, that of the recording layer is 5 nm to 25 nm, that of the second crystallization enhancing material is 2 nm to 20 nm, that of the third dielectric material layer is 40 nm to 100 nm and that of the light transmission protective layer is 0.05 mm to 0.15 mm.

When the wavelength of the recording/reproducing laser beam is 630 nm to 650 nm, it is preferable that the thickness of the substrate is 1.0 mm to 1.2 mm, that of the first dielectric material layer is 100 nm to 150 nm or smaller, that of the reflecting layer is 30 nm to 50 nm, that of the second dielectric material layer is 10 nm to 30 nm, that of the first crystallization enhancing material is 2 nm to 10 nm, that of the recording layer is 5 nm to 25 nm, that of the second crystallization enhancing material is 2 nm to 10 nm, that of the third dielectric material layer is 40 nm to 80 nm and that of the light transmission protective layer is 0.05 mm to 0.15 mm.

As for the material of the transparent substrate 1 of the optical disc having the foregoing structure, a plastic material, such as polycarbonate or acrylic resin, is an advantageous material from a viewpoint of cost reduction, although glass may be employed. A manufacturing method may be an injection molding method (an injection method) or a photopolymer method (a 2P method) using an ultraviolet-ray curing resin. Another method may be employed if the method enables a required shape (for example, a disc shape having a thickness of 1.1 mm and a diameter of 120 mm) and satisfactory smoothness and flatness of the surface of the substrate to be realized.

Although the thickness of the substrate is not limited, it is preferable that thickness is between 0.3 mm and 1.3 mm, inclusive. If the thickness of the substrate is smaller than 0.3 mm, the strength of the crystal decreases or the disc is easily warped. If the thickness is larger than 1.3 mm, the thickness of the disc is made to be larger than the thickness of 1.2 mm of the CD and the DVD. Thus, there is a concern that the same disc tray cannot commonly be used when a drive compatible to all of the foregoing mediums is prepared for market.

When a laser beam is made incident on the light transmission protective layer for performing recording/reproducing, the material of the substrate may be a non-transparent material, such as metal. If the laser beam is made incident on the substrate, a material having substantially no absorptivity with respect to the wavelength of the recording/reproducing laser beam is employed. Note that the material of the substrate may be determined arbitrarily.

When recording/reproducing light is made incident on the substrate, the order of forming the layers which are interposed between the substrate and the light transmission protective layer is inverted from the forming order employed when recording/reproducing light is made incident on the light transmission protective layer. That is, the technique of the present invention may be applied to the structure of, for example, the CD (which has a substrate thickness of 1.2 mm) and the DVD (which has a substrate thickness of 0.6 mm).

A groove track in the form of asperities may be formed on the surface of the substrate on which the multilayered recording film is formed. The grooves are used as guides to enable the laser beam to be moved to an arbitrary position on the disc. The shape of the groove may be any one of a variety of shapes including a spiral shape, a concentric circle, or a bit train shape.

It is preferable that the light transmission protective layer is made of a material having no absorptivity with respect to the wavelength of the recording/reproducing laser beam. Specifically, the material must have a transmittance of 90% or higher. Moreover, it is preferable that the thickness of the light transmission protective layer is 0.3 mm or smaller. When the thickness is 3 $\mu$m to 177 $\mu$m and the numerical aperture NA is made to be a large value (for example, 0.85), previously unattained dense recording can be realized.

To prevent adhesion of dust to the surface of the light transmission protective layer and to prevent damage of the same, a protective film made of an organic material or an inorganic material may be formed. Also in the foregoing case, it is preferable that a material is employed which has substantially no absorptivity with respect to the wavelength of the laser beam.

The optical disc structured such that recording/reproducing is performed from the light transmission protective layer is manufactured by either of the two following methods.

A first method laminates a multilayered film on the substrate having the guide groove, followed by finally forming a smooth and flat light transmission protective layer.

A second method laminates a multilayered film on the light transmission protective layer having the guide groove, followed by finally forming a smooth and flat substrate.

The process for forming asperities on the light transmission protective layer or the process for forming the multilayered film is not always an easy process. Therefore, it is preferable that the first method is employed when considering mass production.

When the first method is employed, the light transmission protective layer is formed by bonding a light transmissive sheet (a film), which is made of a plastic material, such as polycarbonate or acrylic resin, having a thickness of 0.3 mm or smaller and which has sufficient optical smoothness by using an adhesive agent (having a thickness of, for example, 5 μm to 15 μm) made of ultraviolet curing resin. The bonding process us performed by applying ultraviolet rays. Another method may be employed where the ultraviolet curing resin is applied to have a required thickness not larger than 0.3 mm by using a spin coater, followed by applying ultraviolet rays.

If the transmittance is 90% or higher and the thickness is 0.3 mm or smaller, the structure and the manufacturing method of the light transmission protective layer may be arbitrarily be determined. A groove track in the form of asperities may be provided for the light transmission protective layer. As a method of forming the groove track in the form of asperities in the light transmission protective layer having the thickness of 0.3 mm or smaller, an injection molding method, a photopolymer method (a 2P method) or a method of transferring the asperities by pressing and pressurizing may be utilized.

The recording layer 2 of the optical disc having any one of the foregoing structure is made of a phase-change material. That is, the material is a material in which the state is reversibly changed when the material is irradiated with a laser beam. It is preferable that a material is employed having a phase which is reversibly changed between the amorphous state and the crystal state. Any one of known materials may be employed, including a chalcogen compound and sole chalcogen.

The materials are exemplified by systems each containing Te, Se, Ge—Sb—Te, Ge—Te, Sb—Te, In—Sb—Te, Ag—In—Sb—Te, Ge—Sb—Te—Se, In—Sb—Se, Bi—Te, Bi—Se, Sb—Se, Sb—Te, Ge—Sb—Te—Bi, Ge—Sb—Te—Co or Ge—Sb—Te—Au. As an alternative to this, a system may be prepared by introducing an additive in the form of a gas of nitrogen or oxygen into the forgoing system. Among the forgoing materials, it is preferable that a material mainly composed of a Ge—Sb—Te system is employed. A material may be employed which is prepared by adding an arbitrary element, such as Sb or Pd, to the foregoing material. Another material may be employed which is prepared by adding an element in the form of a gas, such as nitrogen or oxygen.

When the Ge—Sb—Te system is employed and the composition of the material is expressed by a composition formula $GE_xSb_yTe_z$ (where each of x, y and z indicates an atomic ratio of each element), a composition range such that $17 \leq x \leq 25, 17 \leq y \leq 25$ and $45 \leq z \leq 65$ enables excellent characteristics to be obtained.

The phase of the foregoing recording layer can be reversibly changed between the amorphous state and the crystal state by adjusting the intensity of the laser beam. The optical change of the reflectance or the like caused from the change in the status is used to perform recording, reproduction, erasing and overwriting. In general, crystallization is temporarily performed (in general, called "initialization") after the film has been formed so as to perform recording/reproducing.

Note that the recording layer may be constituted by two or more continuous different layers (different in terms of either the material, the composition and/or the complex index of refraction).

It is preferable that the reflecting layer is made of any one of a metal element, a semimetal element and a semiconductor having reflectivity with respect to the wavelength of the recording/reproducing laser beam and a thermal conductivity of 0.0004 [J/cm.K.s] to 4.5 [J/cm.K.s], their compound or their mixture. Basically, any one of the known reflecting films for the conventional optical disc may be employed.

The material is exemplified by a sole element, such as Al, Ag, Au, Ni, Cr, Ti, Pd, Co, Si, Ta, W, Mo or Ge or an alloy mainly composed of the foregoing element. In particular, it is preferable that the Al, Ag, Au, Si or Ge is employed from a viewpoint of practical use. The alloy is exemplified by Al—Ti, Al—Cr, Al—Co, Al—Mg—Si, Ag—Pd—Cu, Ag—Pd—Ti or Si—B. The employed material is employed while the optical characteristics and the thermal characteristics are being factored in. In general, if the thickness of the material is made to be a thickness (for example, 50 nm or larger) with which light transmission is inhibited, the reflectance is raised and heat radiation easily occurs. Since the Al material or the Ag material has a high reflectance (for example, 80% or higher when λ=400 nm) also in a short wavelength region, a preferred result can be realized.

In this specification, control of the absorptance (Ac/Aa≧0.9) is realized by, for example, a structure in which a phase of the laser beam made incident on the light transmission protective layer is caused to transmit through the reflecting layer (the reflecting layer for use in the foregoing case is hereinafter called a "transmissive reflecting layer"). Another structure, described below, may be employed in which the light absorptance control layer is formed at an arbitrary position between the light transmission protective layer and the recording layer which incorporates the crystallization enhancing layer.

The former structure (employing the transmissive reflecting layer) encounters limitations of the material and the structure of the reflecting layer. The reflecting layer of the latter structure (employing the light absorptance control layer) and the other structure (the structure having the multilayered dielectric material layer) is not limited if the foregoing conditions are satisfied (the material is made of a metal element, a semimetal element or a semiconductor having the reflectivity with respect to the wavelength of the recording/reproducing laser beam and the thermal conductivity of 0.0004 [J/cm.K.s] to 4.5 [J/cm.K.s], their compound or their mixture).

The transmissive reflecting layer must satisfy the definition for the reflecting layer (the material is made of a metal element, a semimetal element or a semiconductor having the reflectivity with respect to the wavelength of the recording/reproducing laser beam and the thermal conductivity of 0.0004 [J/cm-K-s] to 4.5 [J/cm-K-s], their compound or their mixture). Moreover, it is preferable that the transmissive reflecting layer has a structure that the transmittance of only the reflecting layer (the single layer) with respect to the wavelength of the recording/reproducing laser beam is 10% or higher and a disc having the foregoing reflecting layer has a transmittance of 1% or higher. If the transmittance is lower than the foregoing values, a satisfactory effect of controlling the absorptance cannot be obtained. The material is exemplified by a sole element, such as Si, Au or Ge, a compound or a mixture mainly composed of the foregoing element. When Si is employed with respect to a laser beam having a wavelength of 630 nm to 650 nm, the thickness of Si is made to be 20 nm to 70 nm, and, in particular, about 30 nm to about 50 nm to realize satisfactory characteristics. When Au is employed with respect to a laser beam having a wavelength of 640 nm, the thickness of Au is made to be about 5 nm to about 20 nm to realize satisfactory characteristics. Also Al, Ag, Ni, Cr, Ti, Pd, Co, Ta, W or Mo may be employed when the thickness is 10 nm or smaller. If the thickness of Si or Ge is 20 nm or larger, the condition of the transmittance must be satisfied. When a mixture of the foregoing metal, such as Au, or the semimetal and the dielectric material is employed, the transmittance is raised as compared with the material composed of only Au (and having a thickness of about 5 nm to about 20 nm). Therefore, a design to enlarge the thickness is permitted, and the degree of freedom to determine the thickness is improved. The mixing ratio may be arbitrarily adjusted by using the optical constant and the thermal conductivity as the design factors. In the foregoing case, an arbitrary dielectric material (refer to the description about the dielectric material layer below). The transmissive reflecting layer is made of a mixture of, for example, a material mainly composed of any one of Au, Al, Ag, Si or Ge and a mixture of $ZnS$—$SiO_2$ (having a molar ratio of about 4:1).

The reflecting layer may be composed of two or more different layers (different in terms of the material, the composition and/or the complex index of refraction). The foregoing layers may be continued or a dielectric material layer may be interposed between the layers.

It is preferable that the dielectric layer 7 is made of a material having no absorptivity with respect to the wavelength of the recording/reproducing laser beam. Specifically, it is preferable that a material has an attenuation coefficient k of 0.3 or smaller. The foregoing material is exemplified by a mixture of $ZnS$—$SiO_2$ (having a molar ratio of about 4:1). As an alternative to the mixture of $ZnS$—$SiO_2$, any one of conventional materials for the optical recording medium may be employed to form the dielectric material layer, such as a layer made of nitride, oxide, carbide, fluoride, nitroxide, nitrocarbide, oxycarbide of metal of semimetal, such as Al, Si, Ta, Ti, Zr, Nb, Mg, B, Zn, Pb, Ca, La or Ge; or a layer containing the foregoing material as the main component thereof. Specifically the layer is exemplified by a layer made of $AlN_x$ ($0.5 \leq x \leq 1$) in particular AlN; $Al_2O_{3-x}$ ($0 \leq x \leq 1$) in particular $Al_2O_3$; $Si_3N_{4-x}$ ($0 \leq x \leq 1$) in particular $Si_3N_4$; $SiO_x$ ($1 \leq x \leq 2$) in particular $SiO_2$ or SiO: MgO; $Y_2O_3$, $MgAl_2O_4$; $TiO_x$, ($1 \leq x \leq 2$) in particular $TiO_2$ $BaTiO_3$, $StTiO_3$, $Ta_2O_{5-x}$ ($0 \leq x \leq 1$) in particular $Ta_2O_5$, $GeO_x$ ($1 \leq x \leq 2$); SiC; ZnS; PbS; Ge—N; Ge—N—O, Si—N—O; $CaF2LaF_2$ $MgF_2$, NaF; and $ThF_4$. The layer made of any one of the foregoing materials or a layer mainly composed of the same may be employed. As an alternative to this, their mixture, for example, a layer made of $AlN$—$SiO_2$, may be employed as the dielectric material layer.

Note that the dielectric material layer may be constituted by two or more different layers (different in terms of the material, the composition and/or the complex index of refraction).

When the structure is employed in which the two or more dielectric material layers are continuously formed, it is preferable that the difference in the absorptance n (assuming that the complex index of refraction with respect to the recording/reproducing laser beam is n−ik) between the two adjacent dielectric material layers is large from a viewpoint of the optical design (for example, Ac/Aa can easily be raised). In particular, it is preferable that the difference is 0.2 or greater. When a material, such as $SiO_2$, LiF, $MgF_2$, $CaF_2$, NaF, ZnS or $TiO_2$ is formed adjacent to $ZnS$—$SiO_2$ (having a molar ratio of 4:1), the absorptance ratio Ac/Aa can be raised. When the dielectric material layer is constituted by three or more continuous layers, the layers may be constituted by different (different in terms of the material, the composition and/or the complex index of refraction) layers. As an alternative to this, a structure may be employed in which two or more identical layers are inserted such that $ZnS$—$SiO_2/SiO_2/ZnS$—$SiO_2$. In any case, the number of the layers is not limited if the adjacent dielectric material layers are different from each other (different in terms of the material, the composition and/or the refraction). Since the optical design freedom is improved as the number of the layers increases, Ac/Aa can easily be raised. The multilayered dielectric material layer may be formed at any one of the illustrated positions. When the position is between the light transmission protective layer and the recording layer, a great optical effect can be obtained.

As described above regarding the reflecting layer, this specification attempts to realize the control of the absorptance (Ac/Aa≧0.9) by employing a structure in which the light absorptance control layer is formed at an arbitrary position between the light transmission protective layer and the recording layer which incorporates the crystallization enhancing layer. The light absorptance control layer has the absorptivity with respect to the wavelength of the recording/reproducing laser bean. Moreover, the light absorptance control layer is made of materials, such as a metal element, a semimetal element, a semiconductor, their compound or their mixture, which cause the transmittance of only the light absorptance control layer (the single layer) to be 3% or higher. When the absorptance of only the light absorptance control layer (the single layer) is 3% or higher and the transmittance of only the light absorptance control layer (the single layer) is 20% or higher, control of the absorptance can be improved. If the transmittance of the single layer is 3% or lower, the recording and erasing sensitivity deteriorates. The light absorptance control layer may be made of a sole element, such as Al, Ag, Au, Ni, Cr, Ti, Pd, Co, Si, Ta, W, Mo, Ge or the like, or an alloy composed mainly of the foregoing material. Among the foregoing materials, it is preferable that a compound or a mixture composed mainly of a sole element, such as Au, Al, Ag, Si or Ge is employed from a viewpoint of practical use. When Au, Al or Ag is employed, it is preferable that the thickness is 3 nm to 30 nm from an optical viewpoint.

When Au or Si is employed with respect to, for example, a red laser beam having a wavelength of 640 nm, the thickness of Au is made to be 3 nm to 30 nm and that of Si is made to be 3 nm to 50 nm.

Another material, for example, Ni, Cr, Ti, Pd, Co, Ta, W or Mo may be employed if the thickness is made to be, for example, 15 nm or smaller. When a mixture of the foregoing metal, such as Au, or the semimetal and the dielectric material is employed, the transmittance is raised as compared with the material composed of only Au. Therefore, a design to enlarge the thickness is permitted, improving the degree of freedom to determine the thickness. The mixing ratio may be arbitrarily adjusted by using the optical constant and the thermal conductivity as the design factors. In the foregoing case, an arbitrary dielectric material (refer to the dielectric material layer description below).

The light absorptance control layer may be made of a mixture of, for example, a material mainly composed of any one of Au, Al, Ag, Si or Ge and a mixture of $ZnS$—$SiO_2$ (having a molar ratio of about 4:1).

The linear recording velocity may be made of two or more different (different in terms of the material, the composition and/or the complex index of refraction) and continuous layers. The foregoing layers may be formed into continuous layers, or a dielectric material layer may be interposed between the foregoing layers.

The wavelength of the recording/reproducing laser beam for use with the optical recording medium according to the present invention may be arbitrarily determined. For example, a red laser beam having a wavelength of 630 nm to 650 nm may be employed to perform recording/reproducing. A violet laser beam having a wavelength of 380 nm to 420 nm may be employed to perform recording/reproducing. As a matter of course, the films must be designed to be adaptable to the wavelength of the employed recording/reproducing laser beam.

When the present invention is applied to a system using a channel clock of 60 MHz or higher, having a large capacity and exhibiting a high transfer rate, a large effect can be obtained. The system using the channel clock of 60 MHz or higher must employ the technique of the present invention.

Examples of the present invention will now be described in accordance with experimental results.

EXAMPLES

Example 1

Figure 11:
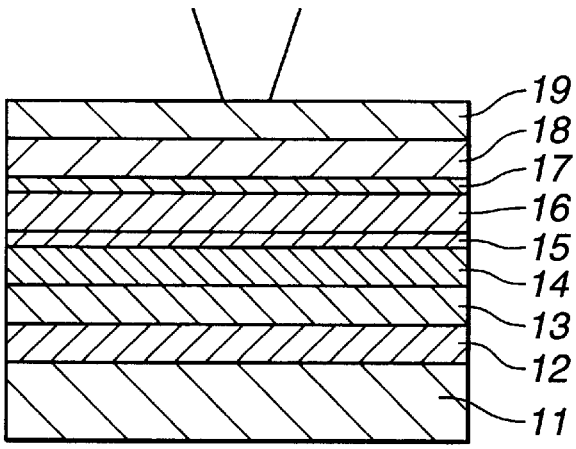
FIG. 11 is a schematic cross sectional view showing an essential portion of the structure of an optical disc according to a first embodiment.

As an example of the present invention, an optical disc structured as shown in FIG. 11 was manufactured. The foregoing optical disc incorporated, on a transparent substrate 11, a first dielectric material layer 12, a transmissive reflecting layer 13, a second dielectric material layer 14, a first crystallization enhancing layer 15, a recording layer 16, a second crystallization enhancing layer 17, a third dielectric material layer 18 and a light transmission protective layer 19 which were laminated.

The materials and thicknesses of the foregoing layers were as follows:

transparent substrate 11: polycarbonate substrate (having a thickness of 1.2 mm) provided with groove transmissive reflecting layer 13: Si (having a thickness of 40 nm) recording layer 16: $Ge_2Sb_2Te_5$ (having a thickness of 15 nm)

Light Transmission Protective Layer 19: polycarbonate sheet (having a thickness of 0.1 mm)

Crystallization Enhancing Layers 15 And 17: Si—C—H—O (having a thickness of 4 nm)

First, Dielectric Material Layer 12: $ZnS$—$SiO_2$ (having a thickness of 150 nm)

Second Dielectric Material Layer 14: $ZnS$—$S'O_2$ (having a thickness of 20 nm)

Third Dielectric Material Layer 18: $ZnS$—$SO_2$ (having a thickness of 60 nm)

Si—C—H—O for forming the crystallization enhancing layers 15 and 17 was obtained by using a SiC target and Ar gas containing 300 ppm-$H_2O$ by an RF sputtering method. The composition of the foregoing material was analyzed by a RBS (rutherford backward scattering). Results of the analysis was shown in Table 1 (unit: atom %).

TABLE 1

| Analyzed Composition of Si—C—H—O film by RBS Method (atom %) | | | |
|---|---|---|---|
| H | C | O | Si |
| 26.0 | 30.0 | 18.0 | 26.0 |

Figure 12:
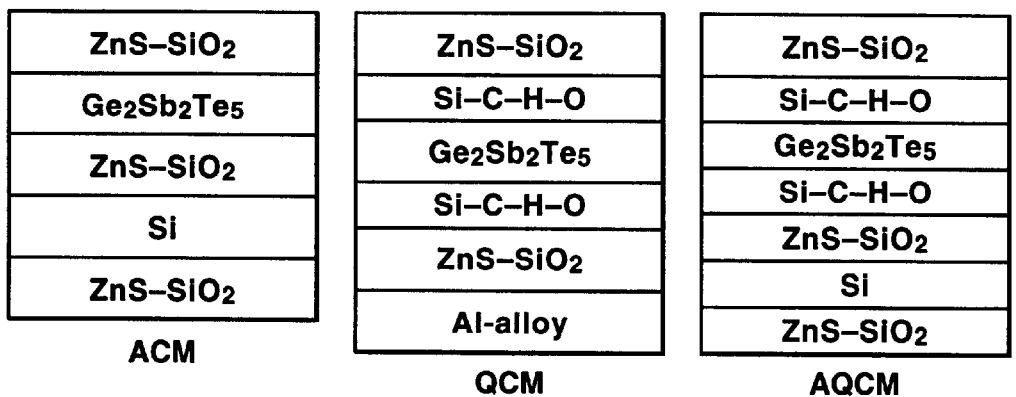
FIG. 12 is a schematic view showing the difference in the structures among AQCM, QCM and ACM.

To make comparisons, a sample (hereinafter called a "QCM") employed only enhancement of crystallization, a sample (hereinafter called an "ACM") employed only the control of the absorptance, and a sample having the conventional structure are manufactured. The structures of the AQCM, QCM and ACM are shown in FIG. 12 to permit comparisons.

Structure Films of QCM
polycarbonate substrate (1.2 mm)/Al alloy (100 nm)/$ZnS$—$SiO_2$ (10 nm)/Si—C—H—O (4 nm)/$Ge_2Sb_2Te_5$ (28 nm)/Si—C—H—O (4 nm)/$ZnS$—$SiO_2$ (85 nm)/polycarbonate sheet (0.1 mm)

Structure of Films of ACM
polycarbonate substrate (1.2 mm)/$ZnS$—$SiO_2$(150 nm)/Si (40 nm)/$ZnS$—$SiO_2$ (20 nm)/$Ge_2Sb_2Te_5$ (15 nm)/$ZnS$—$SiO_2$ (60 nm)/polycarbonate sheet (0.1 mm)

Conventional Structure
polycarbonate substrate (1.2 mm)/Al alloy (100 nm)/$ZnS$—$SiO_2$ (17 nm)/$Ge_2Sb_2Te_5$ (20 nm)/$ZnS$—$SiO_2$ (95 nm)/polycarbonate sheet (0.1 mm)

Optical characteristics (calculated values) of the foregoing samples with respect to the wavelength of 640 nm are shown in Table 2. The complex index of refraction (n–ik) (n: absorptance and k: attenuation coefficient) (measured values) of the materials for use in the calculations were as follows:

| | |
|---|---|
| polycarbonate substrate: | n = 1.58 |
| polycarbonate sheet: | n = 1.58 |
| $ZnS$—$SiO_2$: | n = 2.13 |
| Si—C—H—O: | n = 1.9 |
| ($Ge_2Sb_2Te_5$ in a crystal state): | n = 3.72 |
| | k = 3.52 |
| $Ge_2Sb_2Te_5$ (in an amorphous state): | n = 3.70 |
| | k = 1.73 |
| Si: | n = 3.86 |
| | k = 0.34 |
| Al alloy: | n = 1.35 |
| | k = 6.30 |
| An (employed in another example): | n = 0.19 |
| | k = 3.50 |

TABLE 2

| | Absorptance of Recording Layer (crystal):Ac | Absorptance of Recording Layer (amorphous):Aa | Ac/Aa | Reflectance of Disc (c):Rc |
|---|---|---|---|---|
| AQCM | 64.4% | 55.7% | 1.16 | 14.3% |
| QCM | 74.3% | 91.2% | 0.82 | 23.8% |
| ACM | 60.2% | 50.8% | 1.18 | 16.0% |
| Conventional Structure (for low speed) | 75.2% | 86.7% | 0.87 | 21.8% |

| | Reflectance of Disc (a):Ra | Transmittance of Disc (c):Tc | Transmittance of Disc (a):Ta | Difference in Phase (a – c):Δφ |
|---|---|---|---|---|
| AQCM | 3.6% | 15.0% | 28.8% | –0.22 π (rad.) |
| QCM | 2.5% | 0.00003% | 0.0001% | –0.10 π (rad.) |
| ACM | 4.5% | 16.8% | 31.5% | –0.16 π (rad.) |
| Conventional Structure (for low speed) | 5.0% | 0.00005% | 0.0001% | –0.26 π (rad.) |

The recording/reproducing characteristics of the foregoing samples were and the following factors were measured.

Factors Evaluated
  (1) Change in values of jitters with respect to the number of direct overwritings (DOW);
  (2) Measurement of crosswrite (DOW on main track 1000 times, and DOW two adjacent tracks by a multiplicity of times);
  (3) The relationship between values of jitters and preservation duration when a mark subjected to DOW 1000 times was preserved in a 90° C.-thermostatic chamber (nitrogen atmosphere);

(4) The relationship between number of reproducing operations at which the value of jitters was enlarged when a mark subjected to DOW 1000 times was repeatedly reproduced and reproducing power; and (5) The relationship between a channel clock for use in a recording operation and the value of jitters after 1000 times of DOW operation.

The evaluation of the foregoing factors were performed under the following conditions.

Conditions Under which Evaluations were Performed

Wavelength of Laser Beam: 640 nm (semiconductor laser)

NA of Objective Lens (two-group lens): 0.85

Linear Velocity: 9.24 m/s (1, 7) modulation

Channel Clock: 66 MHz (User Transfer Rate: about 35 Mbps)

Figure 13:
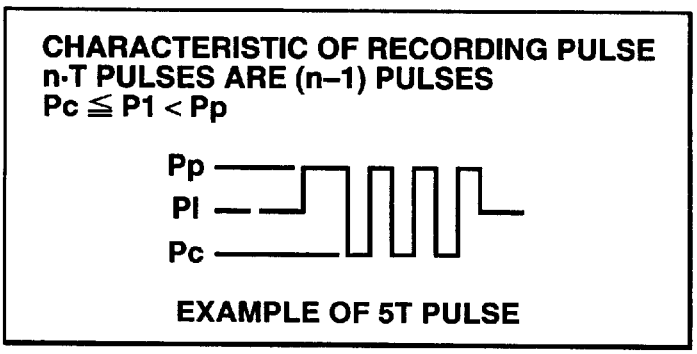
FIG. 13 is a graph showing waveforms of recording pulses.
Figure 14:
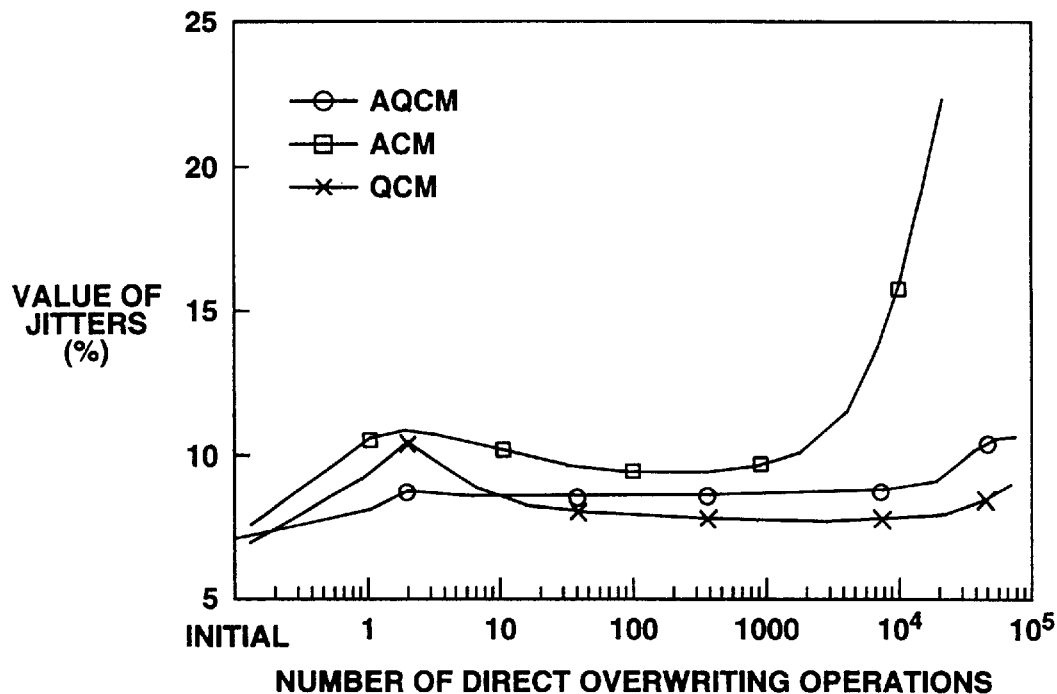
FIG. 14 is a characteristic graph showing change in the values of jitters of the AQCM, QCM and ACM occurring due to change in the number of direct overwriting operations.
Figure 15:
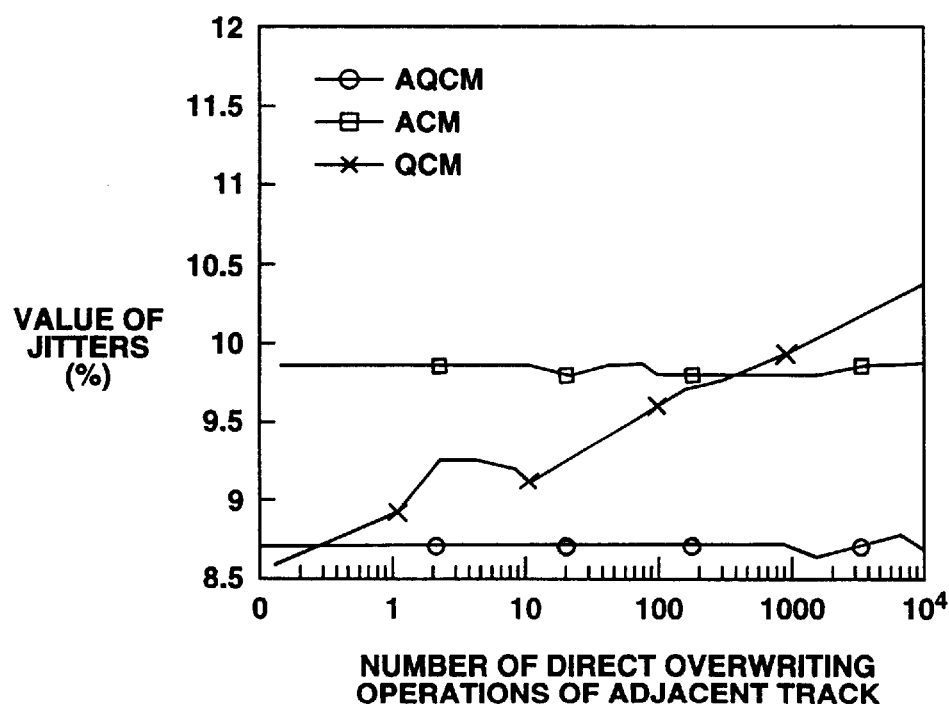
FIG. 15 is a characteristic graph showing a crosswriting characteristic of the AQCM, QCM and ACM.
Figure 16:
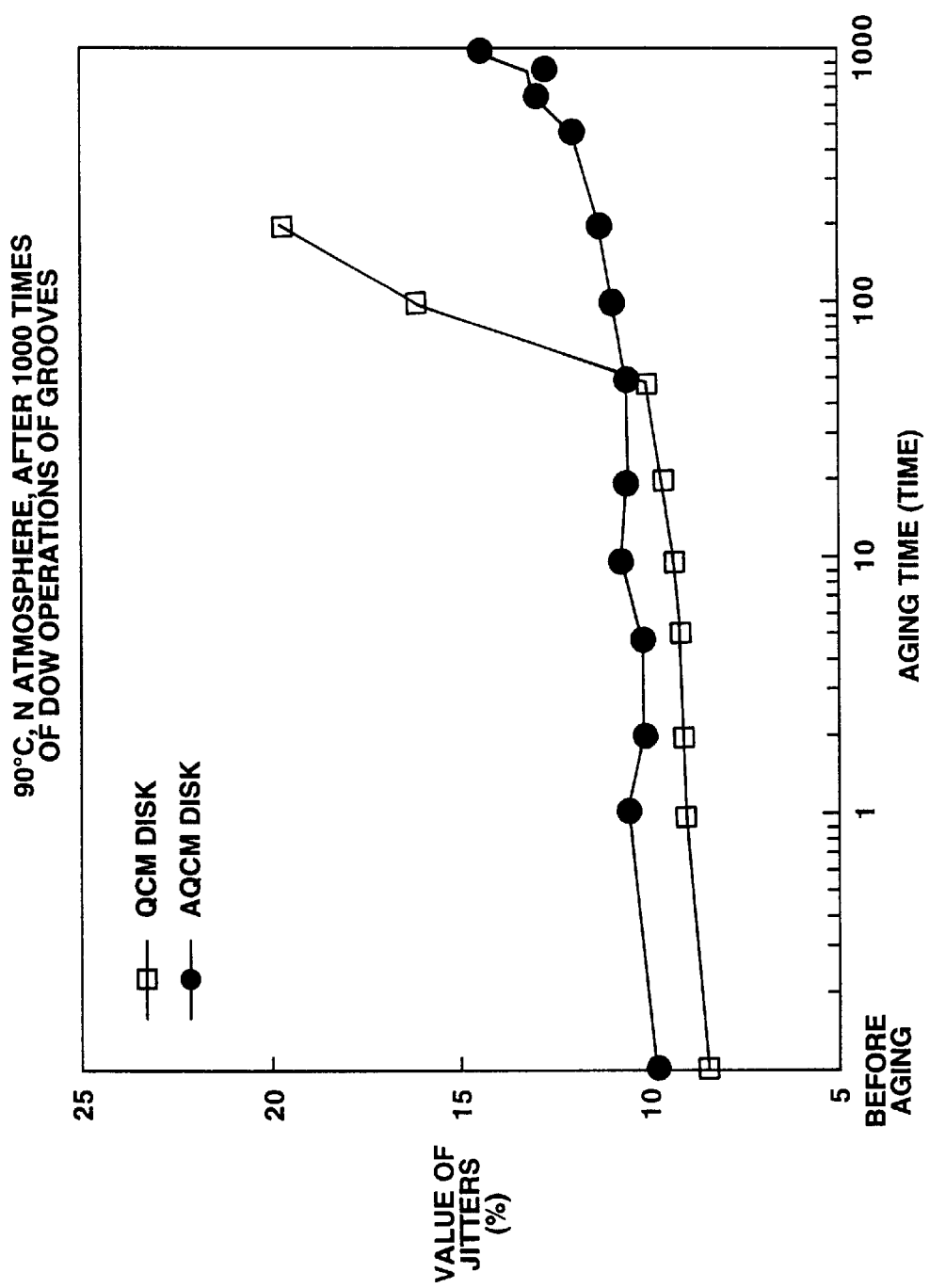
FIG. 16 is a characteristic graph showing the difference in the preservation stability of a recording mark permitted for the AQCM and the QCM.
Figure 17:
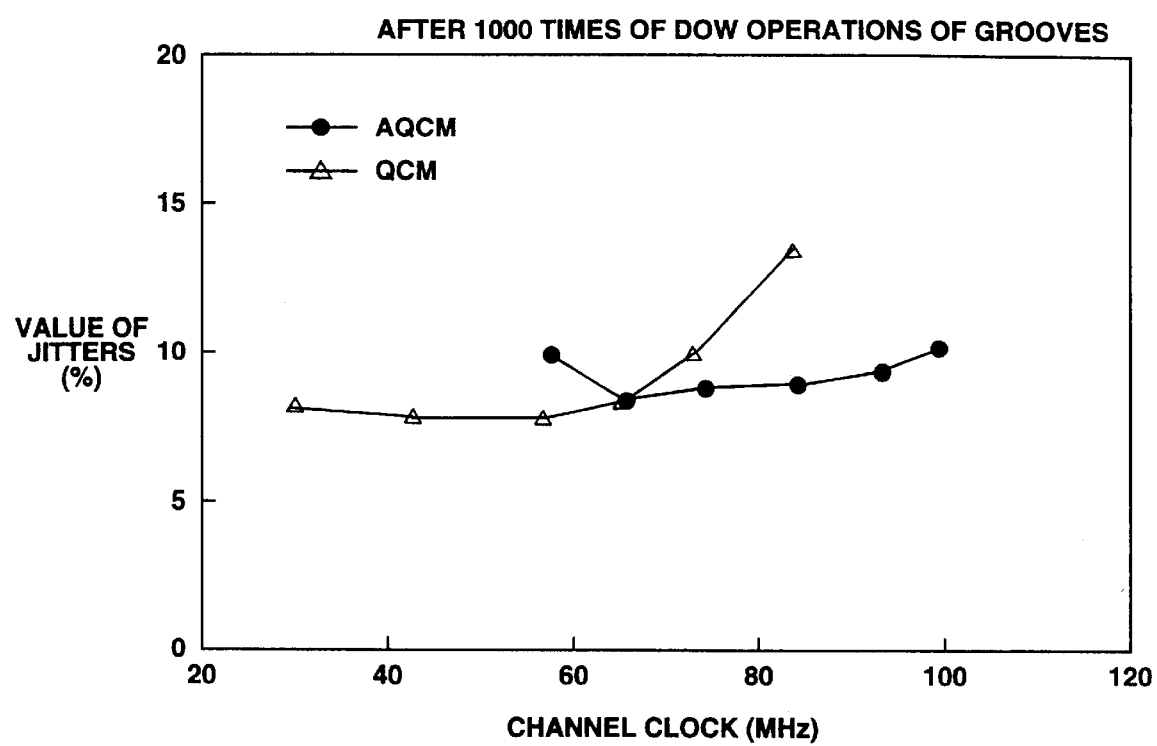
FIG. 17 is a characteristic graph showing change in the values of jitters of the AQCM and the QCM occurring due to a channel clock.

Recording Pulse: comb-shape pulse (see FIG. 13 which illustrates an example of 5T pulse. n·T pulse is composed of n−1 pulses and Pc≦P1<Pp)

| Record Erasing Power: | Pp = 6.5 mW |
| --- | --- |
| | P1 = 2.5 mW |
| | PC = 1 mW |
| Reproducing Power: | Pr = 0.5 mW |
| Linear Density: | 0.21 μm/bit |

Track Pitch: 0.45 μm (land and groove recording)

Definition of land and groove: recess portion with respect to recording/reproducing light is defined as "land", and the projection portion is defined as "grove" (employed data relates to groove unless otherwise specified)

Also comparative examples were evaluated similarly, except that the recording power and the recording pulse were optimized.

Results of the evaluation are shown in Table 3 and FIGS. 14 to 17.

The durability was evaluated such that where the value of jitters after 1000 times of DOW operations was 13% or lower, an O was used in Table 3, and that where the value was higher than 13%, an X was used.

The cross write characteristics were evaluated such that 1000 times of DOW operations on the main track were performed, followed by performing DOW of the two adjacent tracks 1000 times. Results that each encountered a rise of the value of jitters of the main track of 1% or lower were designated by the mark O, those that encountered a rise in the same of 2% or higher were designated by the mark X, and those between the foregoing values were designated by the mark Δ.

The preservation stability of the mark was evaluated such that a mark subjected to DOW 1000 times was preserved in a 90° C.-thermostatic chamber (nitrogen atmosphere) for 100 hours. Samples that encountered a rise in the value of jitters of 3% or lower were designated by the mark O, and those that encountered a rise of 3% or higher were designated by the mark X.

The repeated reproduction characteristics were evaluated such that a mark subjected to 1000 times of DOW operations were repeatedly reproduced with a reproducing power of 0.5 mW. Samples that encountered a rise in the value of jitters, the rise of which was started after 10000 times of the operations were designated by the mark O, those that encountered rise in the same which was started after 1000 times or smaller were designated by the mark X, and samples that encountered intermediate values were given mark Δ.

The optimum channel clocks were evaluated such that the relationship between the channel clock for use in the recording operation and the value of jitters after 1000 times of DOW operations was measured. The substantially central range of the channel clock range with which the value of jitters was made to be 11% or lower was employed.

TABLE 3

| | Value of Jitters after 1000 times of DOW | Durability | Crosswrite characteristic of DOW |
| --- | --- | --- | --- |
| AQCM | 8.5% | O | O |
| QCM | 8.0% | 0 | Δ |
| ACM | 9.7% | X | O |
| Conventional Structure (for low speed) | DOW impossible (60 MHz) | DOW impossible (60 MHz) | Δ (Tested at 30 MHz) |

| | Preservation stability of mark | Repeated reproduction characteristic | Optimum channel clock |
| --- | --- | --- | --- |
| AQCM | O | O (When Aa was recduced, characteristic was expecially improved.) | 66~90 MHz |
| QCM | X | X | 30~60 MHz |
| ACM | 0 | 0 | 30~45 MHz |
| Conventional Structure (for low speed) | O (tested at 30 | Δ (tested at 30 MHz) | 20~35 MHz |

As can be understood from the foregoing results of the evaluations, the AQCM according to the example had superiority, resulting in a realization of high speed overwrite characteristics higher than the high-speed overwrite characteristic (low jitters and excellent durability) which had been the advantage of the QCM; a raising of the speed and linear density followed.

The disadvantages of the QCM, which were unsatisfactory cross write characteristics and repeated reproduction characteristic, were improved by controlling the absorptance (Ac/Aa≧0.9), confirming a permitted rise in the track density.

Although the same crystallization enhancing layer as that of the QCM was employed, a satisfactory mark preservation stability was realized. As a result, excellent reliability was maintained. The reason for this is considered to be that the number of crystal cores of AQCM generated in the amorphous mark during the recording operation is smaller than that of the QCM.

Investigation of Absorptance Aa in Amorphous State

An influence of the absorptance Aa of the recording layer of the optical disc having a structure similar to that of the example (AQCM) in the amorphous state on the recording/reproducing characteristic was evaluated.

Samples (i) to (iv) each having a film structure which was similar to that of the AQCM and a thickness changed as shown in Table 4 were manufactured. Note that Table 4 also shows calculated absorptance Aa of the samples in the amorphous state.

TABLE 4

|  | ZnS—SiO$_2$ (nm) | Si (nm) | ZnS—SiO$_2$ (nm) | Si—C—H—O |
|---|---|---|---|---|
| (i) | 75 | 30 | 12 | 4 |
| (ii) | 105 | 38 | 19 | 4 |
| (iii) | 150 | 40 | 20 | 4 |
| (iv.) | 160 | 60 | 20 | 4 |

|  | Ge$_2$Sb$_2$Te$_5$ (nm) | Si—C—H—O (nm) | ZnS—SiO$_2$ (nm) | Aa (nm) |
|---|---|---|---|---|
| (i) | 14 | 4 | 62 | 36.9% |
| (ii) | 14 | 4 | 61 | 42.8% |
| (iii) | 15 | 4 | 60 | 55.7% |
| (iv) | 15 | 4 | 60 | 63.0% |

Figure 18:
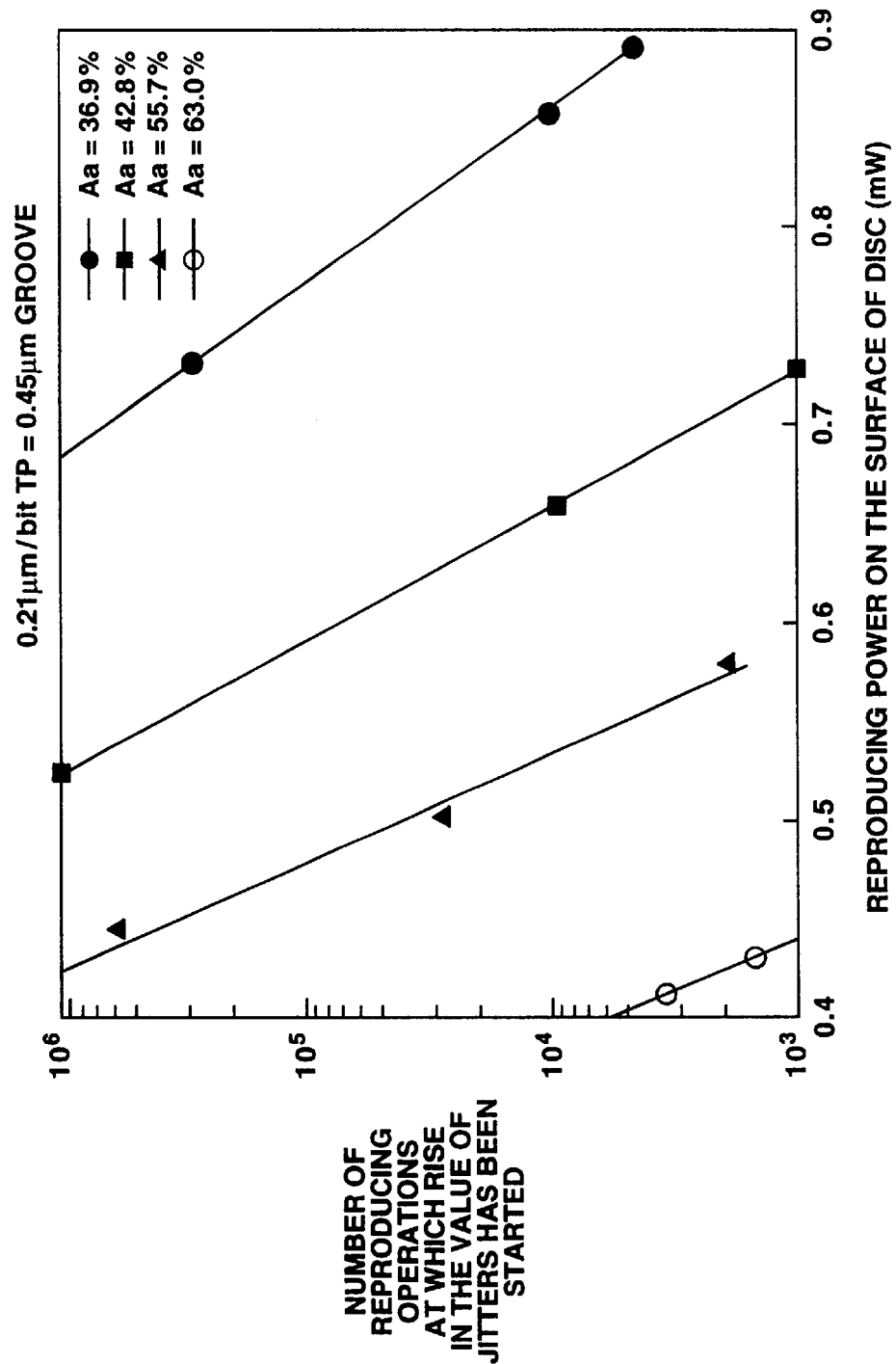
FIG. 18 is a characteristic graph showing the relationship between the absorptance $Aa$ in an amorphous state and the permitted number of reproducing operations.

The samples were used to measure the number of reproducing operations at which the enlargement of the reproducing power and the value of jitters began. Results are shown in FIG. 18.

Figure 19:
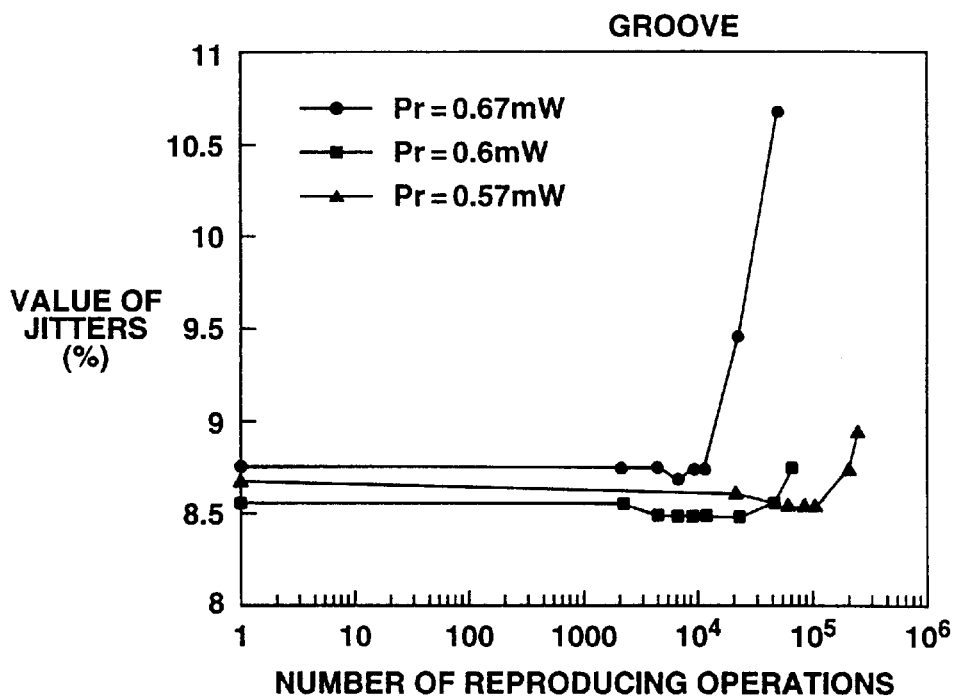
FIG. 19 is a characteristic graph showing the number of reproducing operations shown in FIG. 16.

The number of reproducing operations at which an enlargement of the value of jitters began was determined such that change in the value of jitters depending on the number of reproduction operations was measured as shown in FIG. 19. Then, an inflection point at which the value of jitters rapidly enlarged with respect to the reproducing power was used to perform the determination.

As a result, when Aa of the AQCM was reduced such that Aa≦60%, the repeated reproduction characteristic was improved realizing additional satisfactory reliability. Since intensification of laser noise and reduction in the quantity of light for performing a servo operation caused from reduction in the laser power were prevented, an effect was obtained in improving the degree of freedom in designing the drive.

Investigation of Thickness of Crystallization Enhancing Layer

A structure similar to that according to the example was subjected to a process in which the thickness of Si—C—H—O, which was the material for making the crystallization enhancing layer, was changed. Then, the value of jitters realized after overwriting operations are performed 1000 times was measured. Results are shown in FIG. 20.

Figure 20:
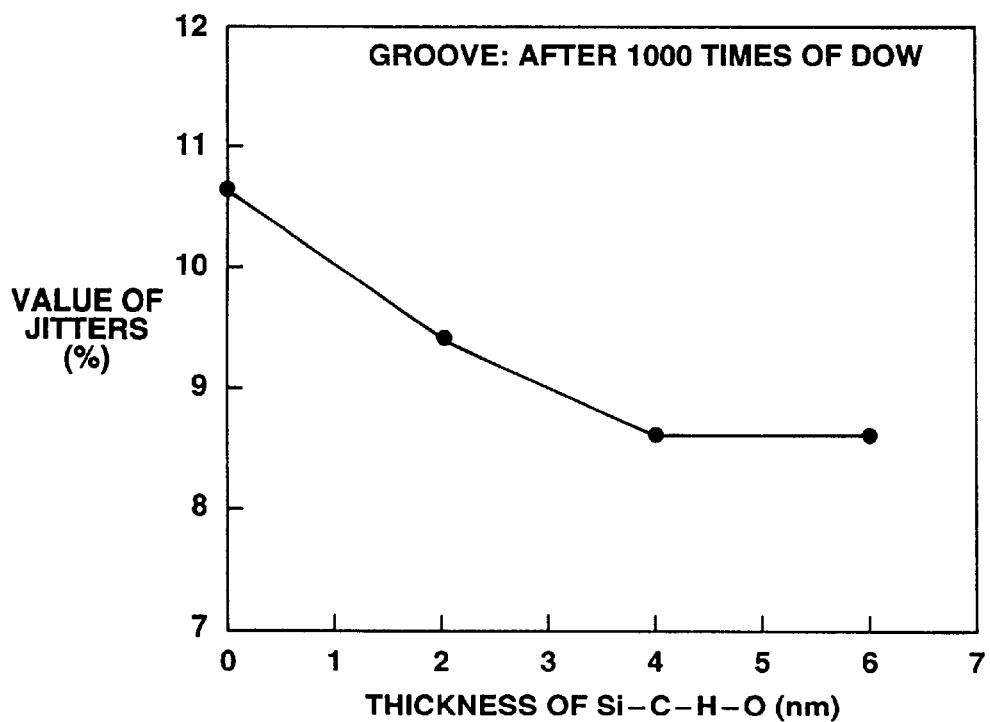
FIG. 20 is a characteristic graph showing dependency of Si—C—H—O on the film thickness.

As can be understood from FIG. 20, if the thickness of the crystallization enhancing layer was 2 nm or larger, an effect of reducing the value of jitters was obtained. When the thickness was 4 nm, the effect was substantially saturated. As a result, the example had a structure where the thickness of the crystallization enhancing layer was made to be 4 nm.

Investigation about Material of the Crystallization Enhancing Layer

Initially, SiC and Si—C—H—O were selected as the materials of the crystallization enhancing layer so that the recording/reproducing characteristics were evaluated.

In the evaluation, SiC was Si$_{50}$C$_{50}$. The composition of the Si—C—H—O was as shown in Table 1.

The film structure of the manufactured optical disc was similar to that of the AQCM according to the example.

The foregoing optical discs were subjected to an evaluating processes to measure the change in the value of jitters (see FIG. 21) depending on the number of direct overwriting (DOW) operations at a channel clock of 66 MHz (linear velocity of 9.24 m/second) and change in the value of jitters (see FIG. 22) depending on the number of direct overwriting (DOW) operations at a channel clock of 76 MHz (linear velocity of 10.6 m/second). The evaluating conditions were similar to those employed in the foregoing example.

Figure 21:
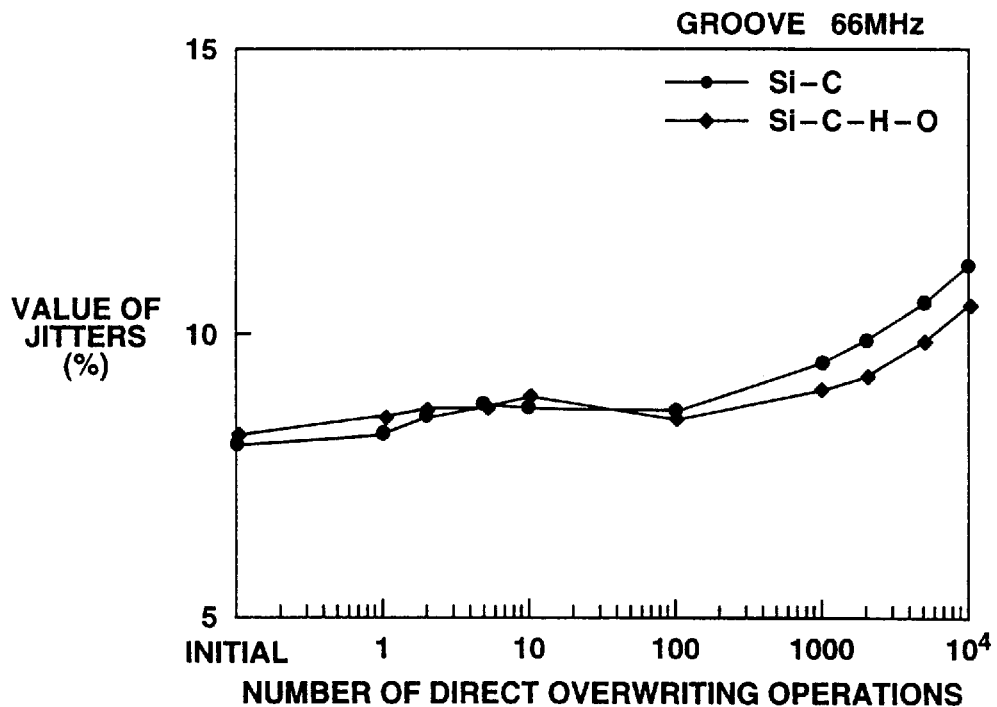
FIG. 21 is a characteristic graph showing change in the values of jitters realized by performing DOW of SiC and Si—C—H—O with a channel clock of 66 MHz.
Figure 22:
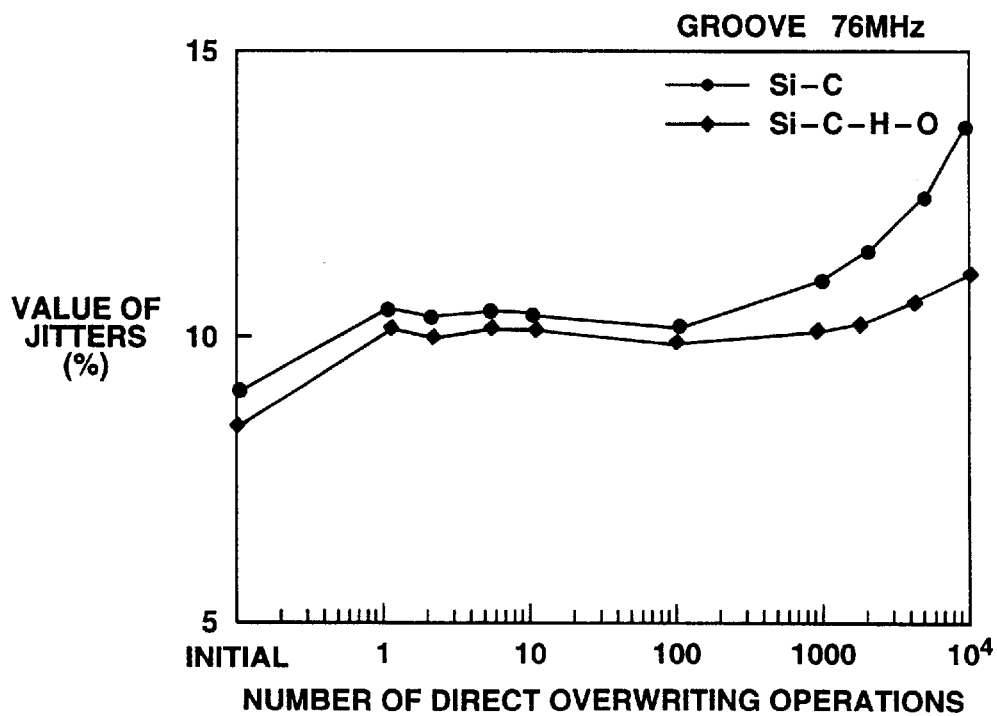
FIG. 22 is a characteristic graph showing change in the values of jitters realized by performing DOW of SiC and Si—C—H—O with a channel clock of 76 MHz.

As can be understood from FIGS. 21 and 22, the difference was enlarged when the channel clock was large. When oxygen and hydrogen were introduced into SiC, recording suitable to high linear speed could be performed.

Figure 23:
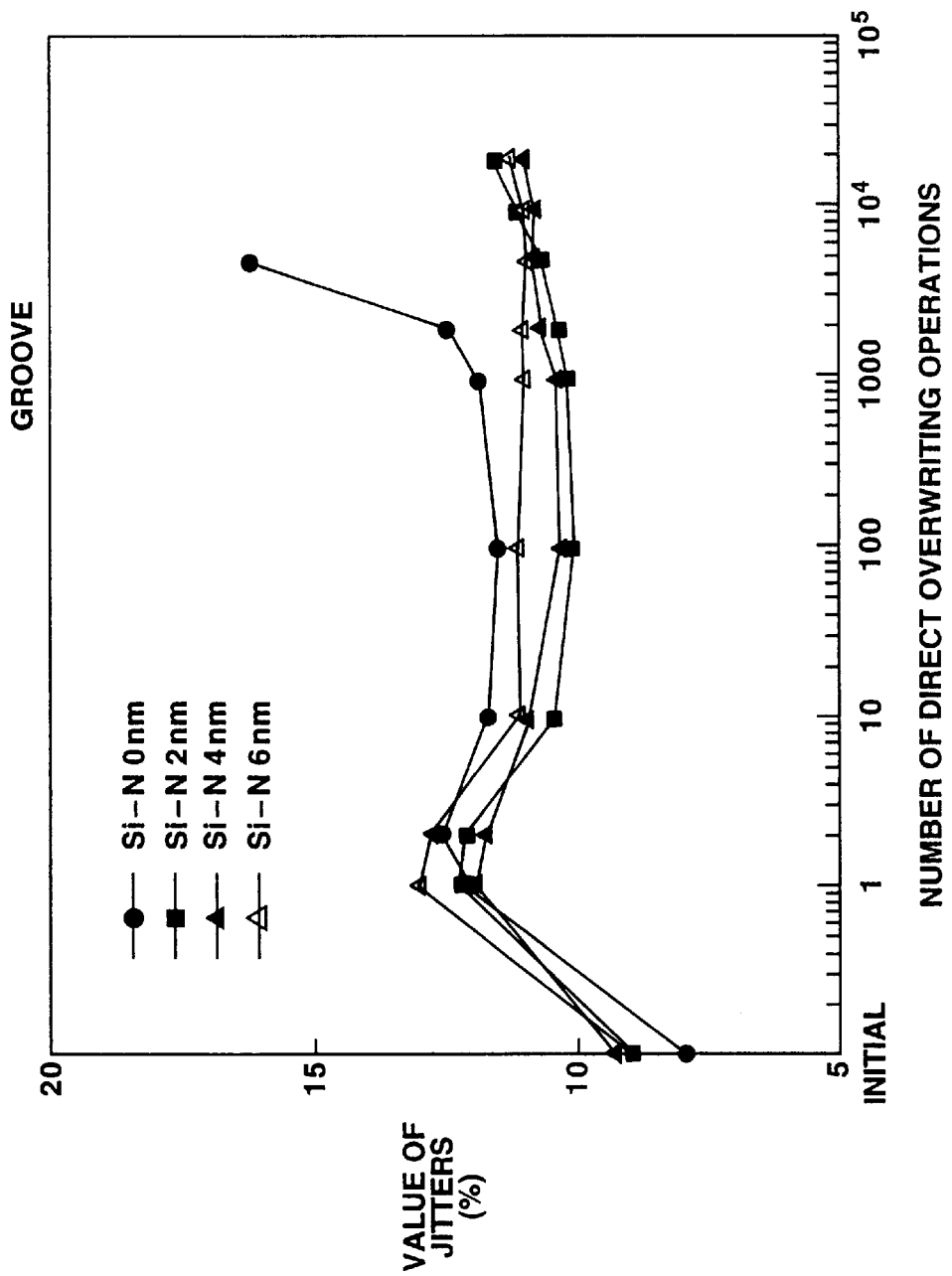
FIG. 23 is a characteristic graph showing the relationship between the number of DOW operations and the values of jitters when Si—N has been formed into a crystallization enhancing layer.
Figure 24:
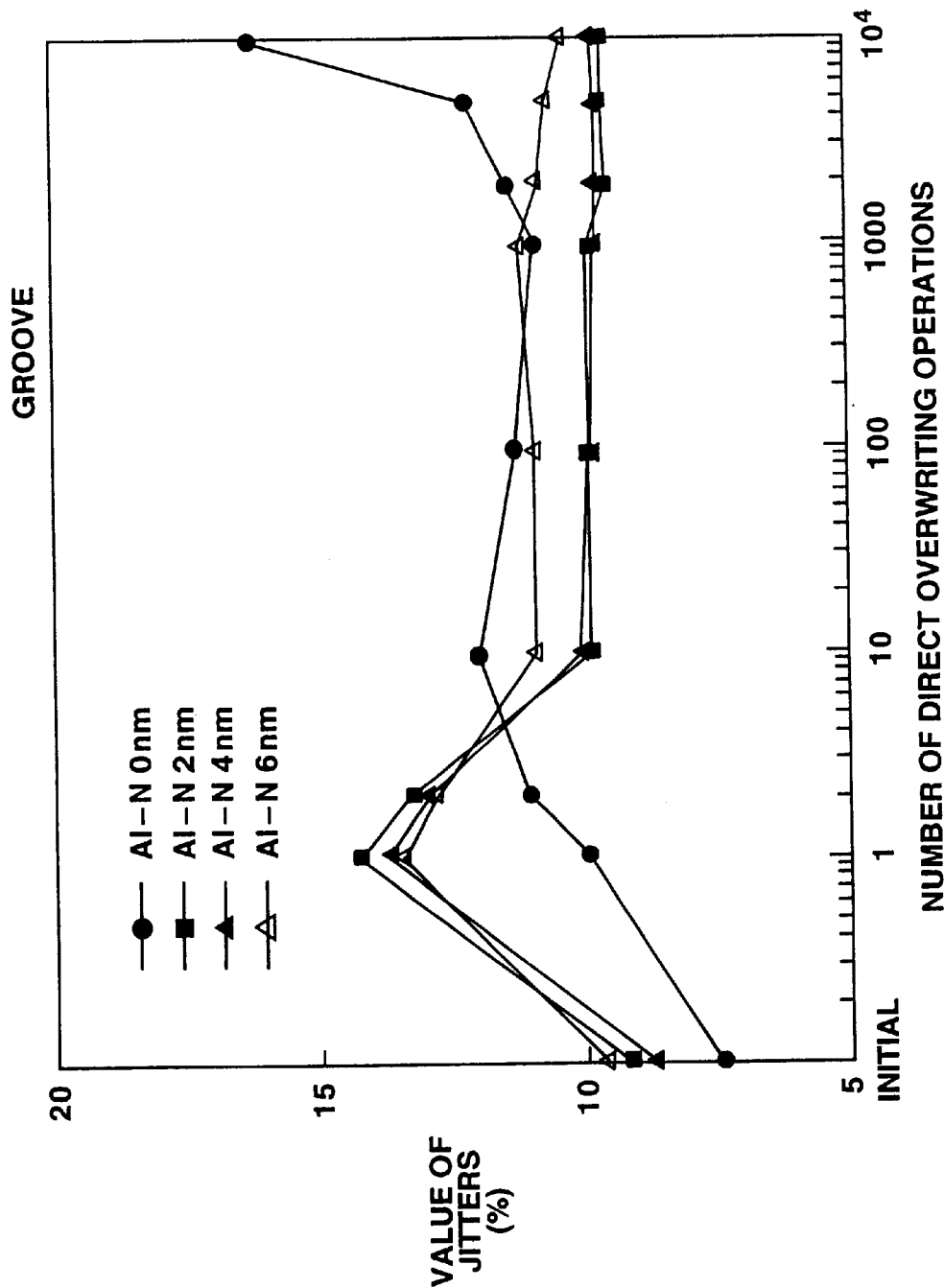
FIG. 24 is a characteristic graph showing the relationship between the number of DOW operations and the values of jitters realized when Al—N is employed to form a crystallization enhancing layer.
Figure 25:
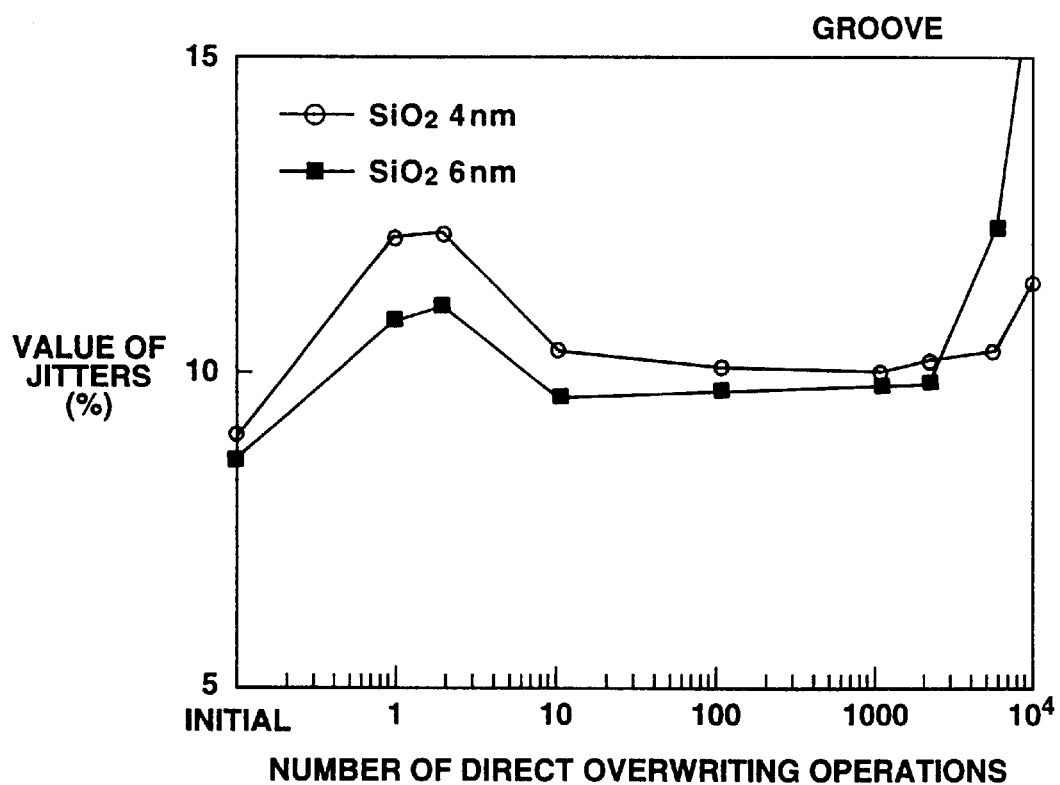
FIG. 25 is a characteristic graph showing the relationship between the number of DOW operations and the values of jitters realized when $SiO_2$ is used to form a crystallization enhancing layer.

Then, the material of the crystallization enhancing layer was changed to Si$_3$N$_4$, AlN and SiO$_2$ and ad similar evaluation was performed. Results are shown in FIGS. 23 to 25.

In any case, the value of jitters after 1000 times of the DOW operations was reduced by 1% to 2%. The reason for this is considered to be that the crystallizing velocity was raised. The durability was also improved. Although the value of jitters temporarily deteriorates until the DOW operations were performed about 10 times, the deterioration was caused from the fact that the initializing condition was not optimized. Therefore, the foregoing deterioration was irrelevant to the essence of the recording/reproducing characteristic.

The foregoing effect was obtained when Al$_2$O$_3$ was employed.

When the foregoing results of the experiments were considered, it was preferable that the crystallization enhancing layer was made of a material mainly composed of any one of Si—C, Si—N, Si—C—O, Si—C—H, Si—C—H—O, Si—N—O, Si—N—H, Si—N—H—O, Si—C—N, Si—C—N—O, Si—C—N—H, Si—C—N—H—O, Si—O, Si—O—H, Al—N and Al—O.

OTHER EXAMPLES

Example 2

Figure 26:
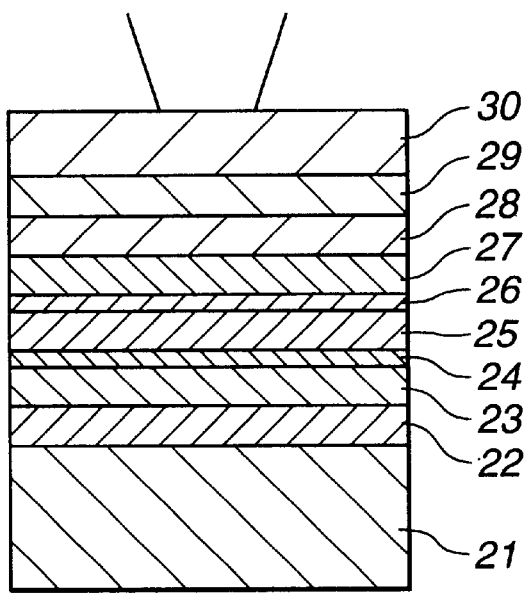
FIG. 26 is a schematic cross sectional view showing an essential portion of the structure of an optical disc according to a second embodiment.

In this example, an optical disc having the light absorptance control layer was employed (a manufactured optical disc having a structure shown in FIG. 26). The optical disc according to this example incorporated a transparent substrate 21 on which a reflecting layer 22, a first dielectric material layer 23, a crystallization enhancing layer, 24; a recording layer 25, a crystallization enhancing layer 26, a second dielectric material layer 27, a light absorption control layer 28, a third dielectric material layer 29 and a light transmittance protective layer 30 were laminated. Materials and thicknesses of the foregoing layers were as follows.

transparent substrate 21: polycarbonate substrate (having a thickness of 1.2 mm) provided with grooves reflecting layer 22: Au (having a thickness of 60 nm)

recording layer 25: Ge,Sb,Tes (having a thickness of 15 nm)

light transmittance protective layer 30: polycarbonate sheet (having a thickness of 0.1 mm)

crystallization enhancing layers 24 and 26: Si—C—H—O (having a thickness of 4 nm)

light absorption control layer 28: Au (having a thickness of 13 nm)

first dielectric material layer 23: ZnS—SiO$_2$ (having a thickness of 15 nm)

second dielectric material layer 27: ZnS—SiO$_2$ (having a thickness of 102 nm)

third dielectric material layer 29: ZnS—SiO$_2$ (having a thickness of 2 nm)

The optical characteristics of the manufactured optical discs are shown in Table 5.

TABLE 5

|  | Absorptance of Recording Layer (crystal):Ac | Absorptance of recording Layer (amorphous): Aa | Ac/Aa | Reflectance of Disc (c):Rc |
|---|---|---|---|---|
| AQCM | 83.2% | 62.6% | 1.33 | 8.9% |

|  | Reflectance of Disc (a):Ra | Transmittance of Disc (c):Tc | Transmittance of Disc (a):Ta | Difference in Phase (a − c):Δφ |
|---|---|---|---|---|
| AQCM | 28.5% | 0.6% | 1.0% | −0.17 π (rad.) |

The foregoing optical disc was evaluated similarly to that according to the example (Example 1). The value of jitters after 1000 times of direct overwriting operations was 15% or lower.

Example 3

Figure 27:
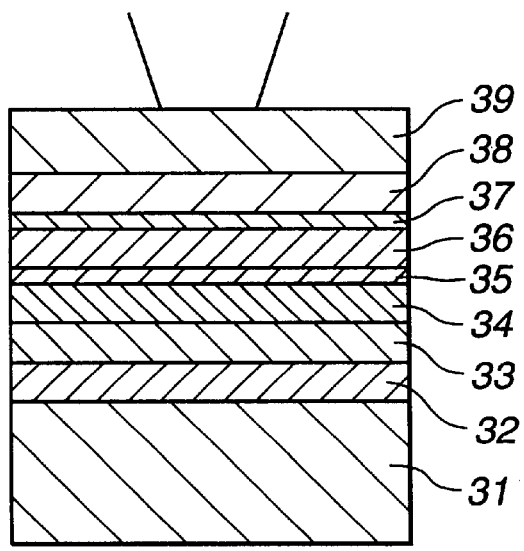
FIG. 27 is a schematic cross sectional view showing an essential portion of the structure of an optical disc according to a third embodiment.

In this example, an optical disc having a transmissive reflecting film was manufactured (an optical disc having a structure shown in FIG. 27). The optical disc according to this example incorporated a transparent substrate 31 on which a first dielectric layer 32, a transmissive reflective layer 33, a second dielectric material layer 34, a crystallization enhancing layer 35, a recording layer 36, a crystallization enhancing layer 37, a third dielectric material layer 38 and a light, transmission protective layer 39 were laminated. Materials and thicknesses of the foregoing layers were as follows.

Transparent substrate 31: polycarbonate substrate (having a thickness of 1.2 mm) provided with a groove
    transmissive reflective layer 33: Au (having a thickness of 15 nm)
    Recording layer 36: $Ge_2Sb_2Te_5$ (having a thickness of 14 mn)
    Light transmission protective layer 39: polycarbonate sheet (having a thickness of 0.1 mm)
    Recording layers 35 and 37: Si—C—H—O (having a thickness of 4 nm)
    First dielectric material layer 32: $ZnS$—$SiO_2$ (having a thickness of 54 nm)
    Second dielectric material layer 34: $ZnS$—$SiO_2$ (having a thickness of 10 nm)
    Third dielectric material layer 38: $ZnS$—$SiO_2$ (having a thickness of 54 nm)

The optical characteristics of the manufactured optical disc are shown in Table 6.

TABLE 6

|  | Absorptance of Recording Layer (crystal):Ac | Absorptance of recording Layer (amorphous): Aa | Ac/Aa | Reflectance of Disc (c):Rc |
|---|---|---|---|---|
| AQCM | 70.1% | 59.5% | 1.17 | 8.2% |

Figure 28:
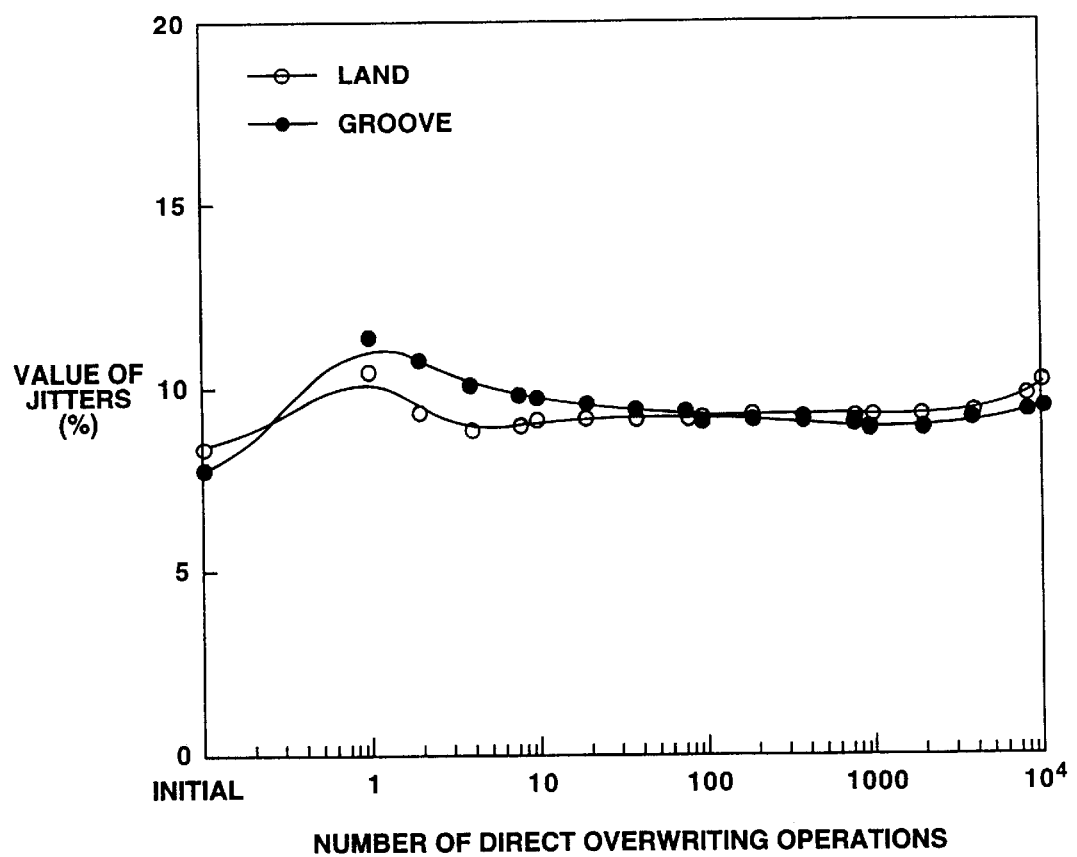
FIG. 28 is a characteristic graph showing the relationship between the number of DOW operations and the values of jitters realized by the structure according to the third embodiment.

The foregoing optical disc was evaluated similarly to the example (Example 1). The value of jitters after 1000 times of direct overwriting operations was 15% or lower. A change in the value of jitters depending on the number of the direct overwriting operation is shown in FIG. 28.

Example 4

Figure 29:
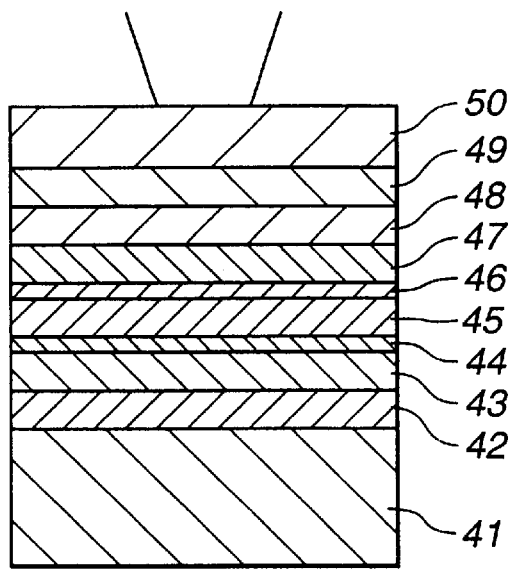
FIG. 29 is a schematic cross sectional view showing an essential portion of the structure of an optical disc according to a fourth embodiment.

In this example, an optical disc having a two layered structure of the transmission reflecting film was manufactured (an optical disc having a structure shown in FIG. 29). The optical disc according to this example incorporated a transparent substrate 41 on which a first dielectric material layer 42, a first transmission reflecting layer 43, a second transmission reflecting layer 44, a second dielectric material layer 45, a crystallization enhancing layer 46, a recording layer 47, a crystallization enhancing layer 48, a third dielectric material layer 49 and a light transmission protective layer 50 were laminated.

Materials and thicknesses of the foregoing layers were as follows:

Transparent substrate 41: polycarbonate substrate (having a thickness of 1.2 mm) provided with grooves
    First transmission reflecting layer 43: Au (having a thickness of 8 nm)
    Second transmission reflecting layer 44: Si (having a thickness of 40 nm)
    Recording layer 47: Ge2Sb2Te5 (having a thickness of 13 nm)
    Light transmission protective layer 40: polycarbonate sheet (having a thickness of 0.1 mm)
    Crystallization enhancing layers 46, 48: Si—C—H—O (having a thickness of 4 nm)
    First dielectric material layer 42: $ZnS$—$SiO_2$ (having a thickness of 52 nm)
    Second dielectric material layer 45: $ZnS$—$SiO_2$ (having a thickness of 20 nm)
    Third dielectric material layer 49: $ZnS$—$SiO_2$ (having a thickness of 60 nm)

Optical characteristics of the manufactured optical disc are shown in Table 7.

TABLE 7

|  | Absorptance of Recording Layer (crystal):Ac | Absorptance of recording Layer (amorphous): Aa | Ac/Aa | Reflectance of Disc (c):Rc |
|---|---|---|---|---|
| AQCM | 53.5% | 41.7% | 1.28% | 14.4% |

|  | Reflectance of Disc (a):Ra | Transmittance of Disc (c):Tc | Transmittance of Disc (a):Tc | Difference in Phase (a − c):Δφ |
|---|---|---|---|---|
| AQCM | 3.8% | 22.2% | 37.6% | −0.10 π (rad.) |

Figure 30:
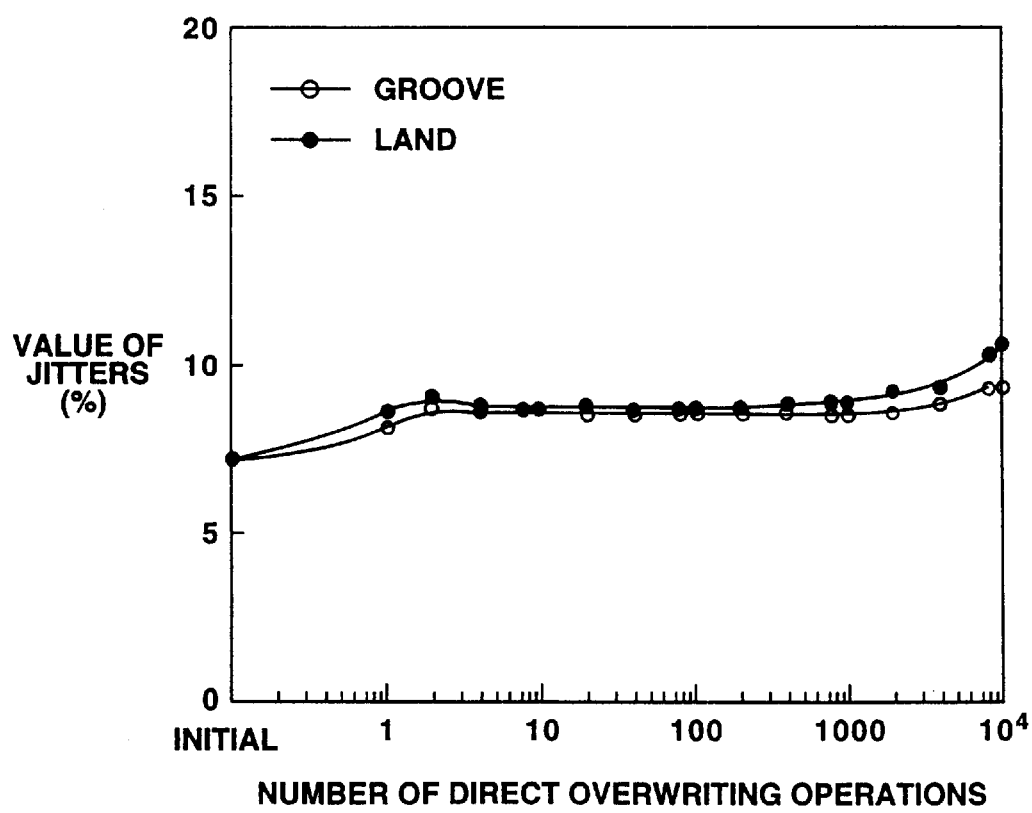
FIG. 30 is a characteristic graph showing the relationship between the number of DOW operations and values of jitters realized by the structure according to the fourth embodiment.

The foregoing optical disc was evaluated similarly to that according to the example (Example 1). The value of jitters after 1000 times of direct overwriting operations was 15% or lower. A change in the value of jitters depending on the number of the direct overwriting operation is shown in FIG. 30.

As can be understood from the foregoing description, according to the present invention, a raising of the speed (high transfer rate) and an enlargement of the capacity, which are two important factors required to improve the performance of the optical disc, can be realized. Moreover, reliability, which inhibits raising of the speed, can simultaneously be improved.

In conclusion, according to the present invention, improvement in the performance and satisfactory reliability can simultaneously be realized with an excellent balance. A technique is provided which is required to form a multilayered structure (the recording layer) of the disc, furthermore reduce the spot size and permit a phase-change recording medium to be employed for a near-field (proximate field) recording.

The above-described method is illustrative of the principles of the present invention. Numerous modifications and adaptions thereof will be readily apparent to those skilled in this art without departing from the spirit and scope of the present invention.

What is claimed is:

1. An optical recording medium comprising:
   a recording layer made of a phase-change material, said recording layer having a ratio of absorptance Ac/Aa of 0.9 or higher, the absorptance of said recording layer in a crystal state being Ac, and the absorptance of said recording layer in an amorphous state being Aa; and
   a crystallization enhancing layer made of a crystallization enhancing material for enhancing crystallization of said phase-change material, made in contact with a surface of said recording layer.

2. An optical recording medium according to claim 1, wherein said recording layer is formed on a substrate.

3. An optical recording medium according to claim 1, further comprising a reflecting layer.

4. An optical recording medium according to claim 1, further comprising a dielectric material layer.

5. An optical recording medium according to claim 1, said recording layer having a crystallization enhancing layer and said recording layer being formed on a substrate; said optical recording medium further comprising:
   a light transmission protective layer having a thickness of 0.3 mm or smaller formed on said recording layer having said crystallization enhancing layer, and wherein a recording/reproducing light is applied from a position adjacent to said light transmission protective layer.

6. An optical recording medium according to claim 5, wherein the thickness of said light transmission protective layer is 3 $\mu$m to 177 $\mu$m.

7. An optical recording medium according to claim 6, wherein said light transmission protective layer is made of polycarbonate or ultraviolet curing resin.

8. An optical recording medium according to claim 5, wherein a reflecting layer is formed on said substrate, and a recording layer incorporating a crystallization enhancing layer is laminated on said reflecting layer.

9. An optical recording medium according to claim 1, wherein said ratio of absorptance is 1.2 or larger.

10. An optical recording medium according to claim 1, wherein the absorptance Aa realized when said recording layer is in the amorphous state is 60% or lower.

11. An optical recording medium according to claim 1, wherein said crystallization enhancing material is a material having a material selected from the group consisting of Si—C, Si—C—O, Si—C—H, Si—C—H—O, Si—N, Si—N—O, Si—N—H, Si—N—H—O, Si—C—N, Si—C—N—O, Si—C—N—H, Si—C—N—H—O, Si—O, Si—O—H, Al—N and Al—O.

12. An optical recording medium according to claim 1, wherein said recording layer contains a material made of Ge—Sb—Te as a recording material.

13. An optical recording medium according to claim 8, wherein said recording layer contains $Ge_xSb_yTe_z$ (where each of x, y and z indicates an atomic ratio of each element and $17 \leq x \leq 25$, $17 \leq y \leq 25$ and $45 \leq z \leq 65$).

14. An optical recording medium according to claim 1, wherein said recording layer contains nitrogen and/or oxygen.

15. An optical recording medium according to claim 3, wherein said reflecting layer has reflectivity in the wavelength region of a recording/reproducing laser beam, said reflecting layer being made of a material having a thermal conductivity of 0.0004 J/cm.K.s to 4.5 J/cm.K.s.

16. An optical recording medium according to claim 3, wherein said reflecting layer is made of a material having a material selected from the group consisting of metal, semimetal, a semiconductor, their compound and their mixture.

17. An optical recording medium according to claim 3, wherein:
   said reflecting layer has a transmittance with respect to a recording/reproducing laser beam in a single layer state of 10% or higher, and
   the transmittance of an overall body of said optical recording medium is 1% or higher.

18. An optical recording medium according to claim 3, wherein said reflecting layer is made of a material selected from the group consisting of a sole element of Al, Ag, Au, Si Ge, a compound, and a mixture mainly composed of any one of the foregoing materials.

19. An optical recording medium according to claim 18, wherein the wavelength of the recording/reproducing laser beam is 630 nm to 650 nm, said reflecting layer is made of Si and the thickness d of said reflecting layer satisfies 20 nm<d<70 nm.

20. An optical recording medium according to claim 3, wherein said reflecting layer is made of a mixture of a dielectric material and a material having a material selected from the group consisting of metal, semimetal, their compound and their mixture.

21. An optical recording medium according to claim 20, wherein said dielectric material is mixture of $ZnS$—$SiO_2$.

22. An optical recording medium according to claim 21, wherein the content of $SiO_2$ in the mixture $ZnS$—$SiO_2$ is 15 mol % to 35 mol %.

23. An optical recording medium according to claim 3, wherein said reflecting layer is formed by continuously laminating a plurality of layers made of different materials.

24. An optical recording medium according to claim 1, wherein said reflecting layer is formed by continuously laminating a plurality of layers made of different materials.

25. An optical recording medium according to claim 5, further comprising:
   a dielectric material layer formed at any one of positions between said light transmission protective layer and said recording layer, between said recording layer and a reflecting layer and between said reflecting layer and said substrate.

26. An optical recording medium according to claim 4, wherein said dielectric material layer is made of a dielectric material having an attenuation coefficient of 0.3 or smaller in a wavelength region of a recording/reproducing laser beam.

27. An optical recording medium according to claim 4, wherein said dielectric material layer comprises a plurality of continuous layers, and one of said layers is made of a different material than another layer.

28. An optical recording medium according to claim 27, wherein the difference in the refraction n of an adjacent dielectric material layer is 0.2 or larger.

29. An optical recording medium according to claim 28, wherein said plural layers include a layer made of the mixture $ZnS$—$SiO_2$ and a layer made of $SiO_x$ (where $1 \leq x \leq 2$).

30. An optical recording medium according to claim 25, wherein said recording layer contains Ge—Sb—Te as a recording material, said reflecting layer is made of Si, said crystallization enhancing material contains Si—C, and said dielectric material layer is made of mixture $ZnS$—$SiO_2$.

31. An optical recording medium according to claim 25, wherein a first dielectric material layer, a reflecting layer, a second dielectric material layer, a first crystallization enhancing material, a recording layer, a second crystallization enhancing material, a third dielectric material layer and a light transmission protective layer are sequentially formed on a substrate.

32. An optical recording medium according to claim 31, wherein the thickness of said substrate is 1.0 mm to 1.2 mm, the thickness of said first dielectric material layer is 200 nm or smaller, the thickness of said reflecting layer is 20 nm to 70 nm, the thickness of said second dielectric material layer is 5 nm to 60 nm, the thickness of said first crystallization enhancing material is 2 nm to 20 nm, the thickness of said recording layer is 5 nm to 25 nm, the thickness of said second crystallization enhancing material is 2 nm to 20 nm, the thickness of said third dielectric material layer is 40 nm to 100 nm and the thickness of said light transmission protective layer is 0.05 mm to 0.15 mm.

33. An optical recording medium according to claim 32, wherein the wavelength of the recording/reproducing laser beam is 630 nm to 650 nm, the thickness of said substrate is 1.0 mm to 1.2 mm, the thickness of said first dielectric material layer is 10 nm to 150 nm or smaller, the thickness of said reflecting layer is 30 nm to 50 nm, the thickness of said second dielectric material layer is 10 nm to 30 nm, the thickness of said first crystallization enhancing material is 2 nm to 10 nm, the thickness of said recording layer is 5 nm to 25 nm, the thickness of said second crystallization enhancing material is 2 nm to 10 nm, the thickness of said third dielectric material layer is 40 nm to 80 nm and the thickness of said light transmission protective layer is 0.05 mm to 0.15 mm.

34. An optical recording medium according to claim 1, wherein a light absorptance control layer is formed on a surface of said recording layer having said crystallization enhancing layer on which a recording/reproducing laser beam is made incident.

35. An optical recording medium according to claim 5, wherein a light absorptance control layer is formed by said light transmission protective layer and said recording layer having said crystallization enhancing layer.

36. An optical recording medium according to claim 34, wherein said light absorptance control layer has an absorptance of 3% or higher in a single layer state with respect to said recording/reproducing laser beam and a transmittance of 20% or higher.

37. An optical recording medium according to claim 36, wherein said light absorptance control layer comprises a material having a material selected from the group consisting of metal, semimetal, their compound and their mixture.

38. An optical recording medium according to claim 36, wherein said light absorptance control layer is made of a material selected from the group consisting of Au, Al and Ag, and wherein the thickness d of said light absorptance control layer satisfies 3 nm<d<30 nm.

39. An optical recording medium according to claim 36, wherein said light absorptance control layer comprises a mixture of a dielectric material and a material selected from the group consisting of metal, semimetal, their compound and their mixture dielectric material.

40. An optical recording medium according to claim 39, wherein said dielectric material is a mixture $ZnS$—$SiO_2$.

41. An optical recording medium according to claim 40, wherein the content of $SiO_2$ in the mixture $ZnS$—$SiO_2$ is 15 mol % to 35 mol %.

42. An optical recording medium according to claim 34, wherein said light absorptance control layer is formed by continuously laminating a plurality of layers made of different materials.

43. An optical recording medium according to claim 1, wherein a channel clock for use in a recording operation is 60 MHz.

* * * * *